US012405017B2

(12) United States Patent
Kim et al.

(10) Patent No.: US 12,405,017 B2
(45) Date of Patent: Sep. 2, 2025

(54) PORTABLE AIR PURIFIER

(71) Applicant: LG ELECTRONICS INC., Seoul (KR)

(72) Inventors: Juhyun Kim, Seoul (KR); Seok-Ho Choi, Seoul (KR); Si Young Oh, Seoul (KR); Sang Hyuk Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 564 days.

(21) Appl. No.: 17/792,935

(22) PCT Filed: Apr. 23, 2020

(86) PCT No.: PCT/KR2020/005390

§ 371 (c)(1),
(2) Date: Jul. 14, 2022

(87) PCT Pub. No.: WO2021/157779

PCT Pub. Date: Aug. 12, 2021

(65) Prior Publication Data

US 2023/0066531 A1 Mar. 2, 2023

(30) Foreign Application Priority Data

Feb. 4, 2020 (KR) ........................ 10-2020-0013181

(51) Int. Cl.
*F24F 8/80* (2021.01)
*F04D 17/06* (2006.01)
(Continued)

(52) U.S. Cl.
CPC ................ *F24F 8/80* (2021.01); *F04D 17/06* (2013.01); *F04D 25/166* (2013.01); (Continued)

(58) Field of Classification Search
CPC .................. F24F 2221/12; F24F 13/28; B01D 2201/0415; B01D 2273/30
See application file for complete search history.

(56) References Cited

U.S. PATENT DOCUMENTS 6,017,375 A * 1/2000 Duell .................... F24F 1/0071 55/497
7,998,231 B2 * 8/2011 Zheng .................... B01D 46/62 55/467
(Continued)

FOREIGN PATENT DOCUMENTS

CN 1752618 3/2006
CN 203454279 2/2014
(Continued)

OTHER PUBLICATIONS

German Office Action dated Nov. 30, 2022.
International Search Report dated Oct. 13, 2020 issued in Application No. PCT/KR2020/005390.

*Primary Examiner* — Magali P Slawski
*Assistant Examiner* — Rachel Marie Slaugovsky
(74) *Attorney, Agent, or Firm* — KED & ASSOCIATES

(57) ABSTRACT

A portable air purifier is provided. In the portable air purifier, a fan base is disposed between a fan module including a mixed flow fan and a filter, and forms a passage that connects the filter and the fan module while coupling the filter and the fan module. Accordingly, the portable air purifier can ensure improvement in air purification performance with no increase in size of the portable air purifier.

6 Claims, 22 Drawing Sheets

(51) Int. Cl.

| | |
|---|---|
| ***F04D 25/16*** | (2006.01) |
| ***F04D 29/60*** | (2006.01) |
| ***F04D 29/70*** | (2006.01) |
| ***F24F 3/16*** | (2021.01) |
| ***F24F 13/20*** | (2006.01) |
| ***F24F 13/28*** | (2006.01) |

(52) U.S. Cl.

CPC ......... *F04D 29/602* (2013.01); *F04D 29/703* (2013.01); *F24F 3/16* (2013.01); *F24F 13/20* (2013.01); *F24F 13/28* (2013.01); *F05D 2250/51* (2013.01)

(56) References Cited

U.S. PATENT DOCUMENTS

| | | | | |
|---|---|---|---|---|
| 2005/0193803 | A1 | 9/2005 | Carlson et al. | |
| 2007/0221061 | A1* | 9/2007 | Steiner ...................... | F24F 8/10 55/467 |
| 2015/0352480 | A1* | 12/2015 | Morison ............ | B01D 46/0086 96/417 |
| 2023/0211269 | A1* | 7/2023 | Hsieh ................. | B01D 46/0005 96/226 |

FOREIGN PATENT DOCUMENTS

| | | | |
|---|---|---|---|
| CN | 205332377 | 6/2016 | |
| CN | 205468438 | 8/2016 | |
| CN | 206540257 | 10/2017 | |
| EP | 3385625 B1 * | 11/2022 | ............. B01D 46/42 |
| KR | 10-2017-0138289 | 12/2017 | |
| KR | 10-2027302 | 10/2019 | |
| KR | 10-2032401 | 10/2019 | |
| KR | 10-2055522 | 1/2020 | |

* cited by examiner

FIG. 22

| Category | Width of minimum gap point [mm] | Application projection projection rib | Noise [dB] | Press volume [N] |
|---|---|---|---|---|
| First experimental example | 0.4 | Without projection rib | 41.7 | 4.7 |
| Second experimental example | 1.0 | Without projection rib | 42.2 | 27.9 |
| Third experimental example | 1.0 | With projection rib | 41.7 | 28.4 |

PORTABLE AIR PURIFIER

CROSS-REFERENCE TO RELATED PATENT APPLICATIONS

This application is a U.S. National Stage Application under 35 U.S.C. § 371 of PCT Application No. PCT/KR2020/005390, filed Apr. 23, 2020, which claims priority to Korean Patent Application No. 10-2020-0013181, filed Feb. 4, 2020, whose entire disclosures are hereby incorporated by reference.

TECHNICAL FIELD

Disclosed herein is a portable air purifier, and specifically, a portable air purifier that can be carried for use.

BACKGROUND ART

Air purifiers are widely used in our daily lives. The devices can filter physical particles such as dust, fine dust, ultra fine dust and the like, chemical substances such as odorant particles, harmful gases and the like, and microorganisms such as germs, viruses and the like, in air, to purify the air.

People cannot live without air purifiers in an industrial society since more and more people are greatly affected by fine dust and suffer from allergies. Accordingly, there is a growing demand for the device.

Ordinarily, a large-sized air purifier is used in a house that is 100 square meters or greater. The air purifier can be provided with a filter for physical particles such as dust and the like, a filter for chemical substances such as gas and the like, and a filter for microorganisms such as germs, viruses and the like, in combination. That is, such a large-sized air purifier capable of accommodating various types of filters can be used in a large space.

However, air purifiers are rarely used in a narrow space such as a studio apartment, a space in a vehicle and the like, or in a very wide space such as a public library and the like or an outdoor space, considering space availability, portability and energy efficiency. Additionally, a user who moves from place to place usually uses an air purifier small enough to carry. Under the circumstances, there is a growing need for a portable air purifier that is easy to carry for use.

Portable air purifiers need to be small and lightweight enough for users to carry such that the users can easily carry and use the portable air purifiers anywhere. That is, the devices are useful for people who often go out and move from place to place instead of staying in a place such as a house.

The amount of purified air discharged from a portable air purifier is less than the amount of purified air discharged from an ordinary air purifier that is installed in a place. Additionally, the portable air purifier discharges purified forward in a narrower range than the ordinary air purifier. The portable air purifier has the above problems inherently, since the portable air purifier has a small size. As the size of the portable air purifier decreases, it is difficult to increase the amount of purified air discharged and the range of forward discharge of purified air.

A decrease in the amount of discharge of purified air and the range of forward discharge of purified air of the portable air purifier makes it difficult for air purified by the portable air purifier to reach a user, in particular, a user's face. The portable air purifier's failure in reaching the user's face means that the portable air purifier cannot provide air purification performance properly.

DESCRIPTION OF INVENTION

Technical Problems

One objective of the present disclosure is to provide a portable air purifier that is compact and lightweight, and has an improved structure enabling purified air to reach a user's face effectively.

Another objective of the present disclosure is to provide a portable air purifier that has an improved structure capable of suppressing the occurrence of flow low caused by whirlwind.

Yet another objective of the present disclosure is to provide a portable air purifier that has an improved structure capable of reducing the possibility of wear or damage to a fan and its surrounding components.

Technical Solutions

In a portable air purifier of one embodiment, a fan base is disposed between a fan module including a mixed flow fan and a filter, and forms a passage that connects between the filter and the fan module while coupling the filter and the fan module.

In a portable air purifier of another embodiment, a fan cover and a fan base are disposed at one side and the other side of a fan module including a mixed flow fan-type fan in the axial direction, the fan base includes a bell mouth protruding toward the fan module, and at least a portion of a fan is inserted into an air discharge part being formed at the fan cover in a way that penetrates the fan cover.

Accordingly, in the portable air purifier, the size of the fan may increase, or the size of the portable air purifier may decrease as much as space occupied by a guide vane decreases.

Additionally, in the portable air purifier having the above structure, since at least a portion of the fan is inserted into the fan cover, the entire size of the portable air purifier may not increase although the bell mouth is added to guide a suction flow.

In a portable air purifier of another embodiment, a projection rib is disposed outside a bell mouth in the radial direction of the bell mouth, and is spaced a predetermined distance apart from a shroud while protruding toward the shroud in the lateral direction and forms a slant surface parallel with a slant surface of the shroud.

Accordingly, flow loss caused by whirlwind may be suppressed, and the rigidity of the fan base may increase, suppressing the deformation of the fan base, caused by an external force.

A portable air purifier according to one aspect may include: a case having a suction surface on one side thereof in the axial direction and having a discharge surface on the other side thereof in the axial direction; a filter being disposed between the suction surface and the discharge surface; a fan module being disposed between the discharge surface and the filter, and suctioning air, having passed through the filter, and discharging the air to the discharge surface; and a fan base being disposed between the filter and the fan module, being coupled to the fan module, and forming a passage that connects between the filter and the fan module.

The fan base includes a base plate being disposed between the filter and the fan module; and a fan inlet being formed at the base plate in a way that penetrates the base plate, and forming a passage that connects between the filter and the fan module, for example.

The fan base further includes a bell mouth protruding from the base plate in the axial direction, and the fan inlet is formed at the inside of the bell mouth in a way that penetrates in the radial direction of the bell mouth, for example.

At least a portion of the bell mouth is disposed to overlap the fan module, for example.

The fan module includes a fan being rotatably disposed between the bell mouth and the discharge surface, the bell mouth has a first surface that faces the filter module and is convex toward the filter module and has a second surface that faces the fan module and is depressed, while protruding from the inner circumferential surface of the base plate in the axial direction, and at least a portion of the fan is inserted into space surrounded by the second surface, for example.

The fan includes a hub being rotatably provided, a shroud being spaced a predetermined distance apart from the hub and being disposed outside the hub in the radial direction of the hub, and a fan blade protruding from the hub in the centrifugal direction and connecting between the hub and the shroud, and at least a portion of the shroud is inserted into the space surrounded by the second surface, for example.

The shroud forms a slant surface that inclines in the centrifugal direction as the shroud becomes farther from the filter module in the axial direction, and the fan base further includes a projection rib that protrudes from the base plate toward the shroud in the axial direction while surrounding the bell mouth from the outside in the radial direction, for example.

The projection rib is spaced a predetermined distance apart from the shroud, and forms a slant surface parallel with the slant surface of the shroud, for example.

The projection rib forms a slant surface that extends in the centrifugal direction from an end portion outside the bell mouth in the radial direction of the bell mouth, for example.

The base plate, the bell mouth and the projection rib are integrally formed, for example.

The direction in which the fan suctions air is the same as the direction in which the suction surface and the discharge surface are disposed, for example.

The portable air purifier further includes a fan cover being disposed between the discharge surface and the fan module, the fan cover is provided with an air discharge part forming a passage that connects between the discharge surface and the fan, and the fan module is disposed to face the air discharge part, for example.

The air discharge part is formed at the fan cover in a way that penetrates in the axial direction, and at least a portion of the fan module is inserted into the air discharge part, for example.

The fan base further includes a bell mouth that protrudes from the base plate in the axial direction, and at least a portion of the bell mouth is disposed to overlap the fan module, for example.

The fan module includes: a motor including a stator and a rotor that is disposed outside the stator in the radial direction of the stator; a fan case supporting at least a portion of the motor; and a fan rotating together with the rotor, the fan case is coupled to the fan base, and the fan base is coupled to the filter, for example.

The fan base includes a base plate being disposed between the filter and the fan module, and a fastening projection protruding from the base plate toward the fan case, and the fan module includes a projection boss protruding from the fan case toward the fan base and being coupled to the fastening projection, for example.

The portable air purifier further includes a fan cover being disposed between the discharge surface and the fan module, and the fan cover includes a fastening projection protruding toward the fan module and being coupled to the fan case, for example.

Additionally, a fan outlet is formed at the fan case in a way that penetrates the fan case, the fan cover is provided with an air discharge part forming a passage that connects between the discharge surface and the fan outlet, and as the fastening projection is coupled to the fan case, the fan outlet and the air outlet are disposed to overlap each other in the axial direction, for example.

The fan module includes a mixed flow fan that suctions air having passed through the filter in the axial direction and discharges the air in a direction between the axial direction and the radial direction, for example.

Advantageous Effects

The portable air purifier according to the present disclosure is provided with a fan that is advantageous in discharging high-pressure high-speed air far away without a structure such as a guide vane, such that the size of the fan increases or the size of the portable air purifier decreases as much as space occupied by the guide vane decreases.

Thus, according to the present disclosure, air purification performance improves further, with no increase in the size of the portable air purifier, caused by the fan.

According to the present disclosure, flow loss caused by whirlwind is suppressed, noise is reduced, and a high level of suction and discharge performance is provided, ensuring improvement in air purification performance.

According to the present disclosure, the occurrence of contact between a fan and a fan base, caused by an external force, is effectively suppressed, reducing the possibility of wear or damage to the fan and its surrounding components and ensuring improvement in durability of a portable air purifier.

BRIEF DESCRIPTION OF DRAWINGS

FIG. 22 is a table showing results of measurement of noise and press volume, with or without a projection rib.

DETAILED DESCRIPTION OF EXEMPLARY EMBODIMENTS

Figure 1:
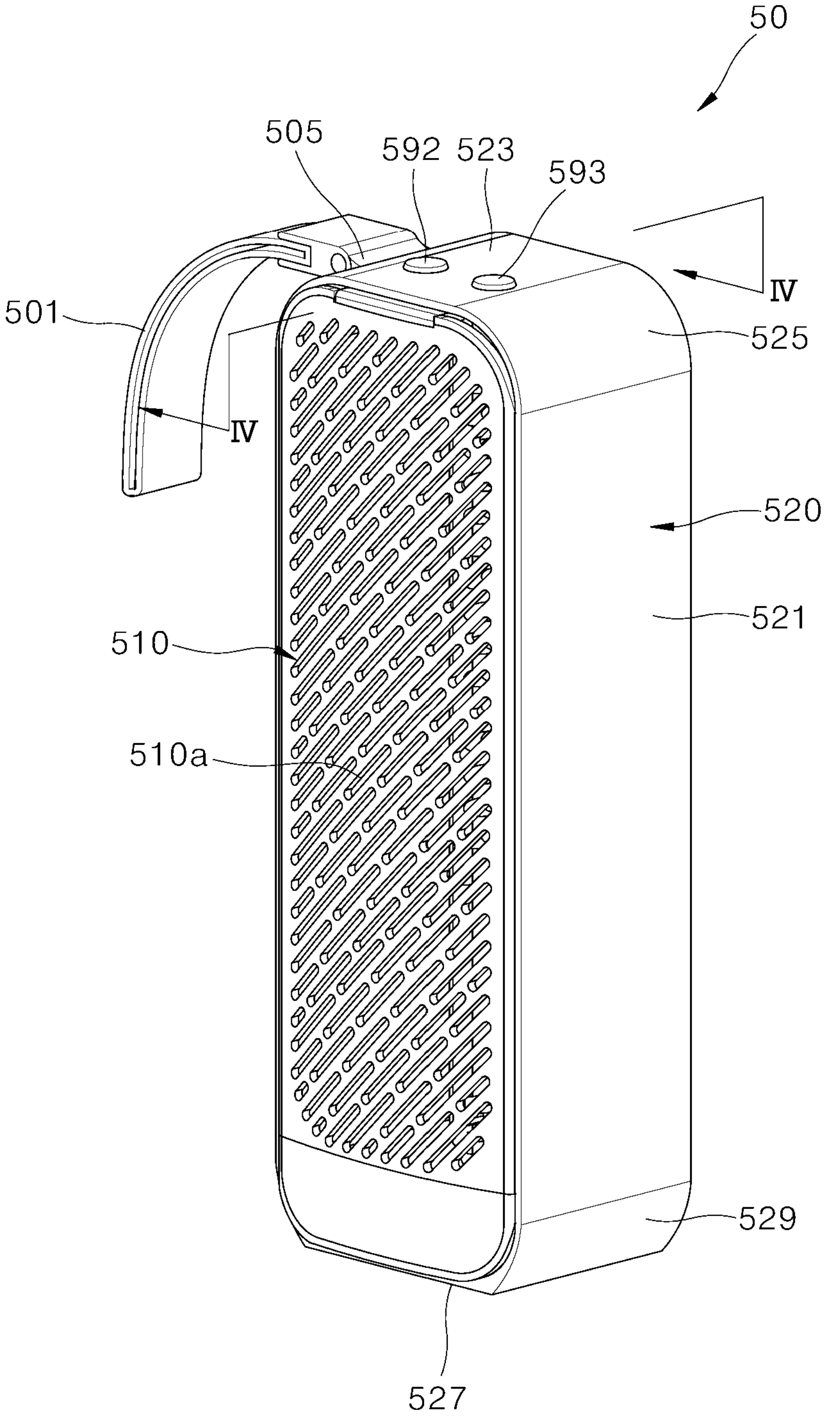
FIG. 1 is a front perspective view showing the front surface side of a portable air purifier of one embodiment.

The above-described aspects, features and advantages are specifically described hereunder with reference to the accompanying drawings such that one having ordinary skill in the art to which the present disclosure pertains can easily embody the technical spirit of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When one component is described as being "in the upper portion (or the lower portion)" or "on (or under)" another component, one component can be directly on (or under) another component, and an additional component can be interposed between the two components.

When any one component is described as being "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provided as a single one or a plurality of ones, unless stated to the contrary.

In the disclosure, singular forms include plural forms as well, unless explicitly indicated otherwise. It is to be understood that the terms such as "comprise" or "include" and the like, when used in this disclosure, are not interpreted as necessarily including stated components or steps, but can be interpreted as excluding some of the stated components or steps or as further including additional components or steps.

Throughout the disclosure, the terms "A and/or B" as used herein can denote A, B or A and B, and the terms "C to D" can denote C or greater and D or less, unless stated to the contrary.

[Exterior of Portable Air Purifier]

Figure 2:
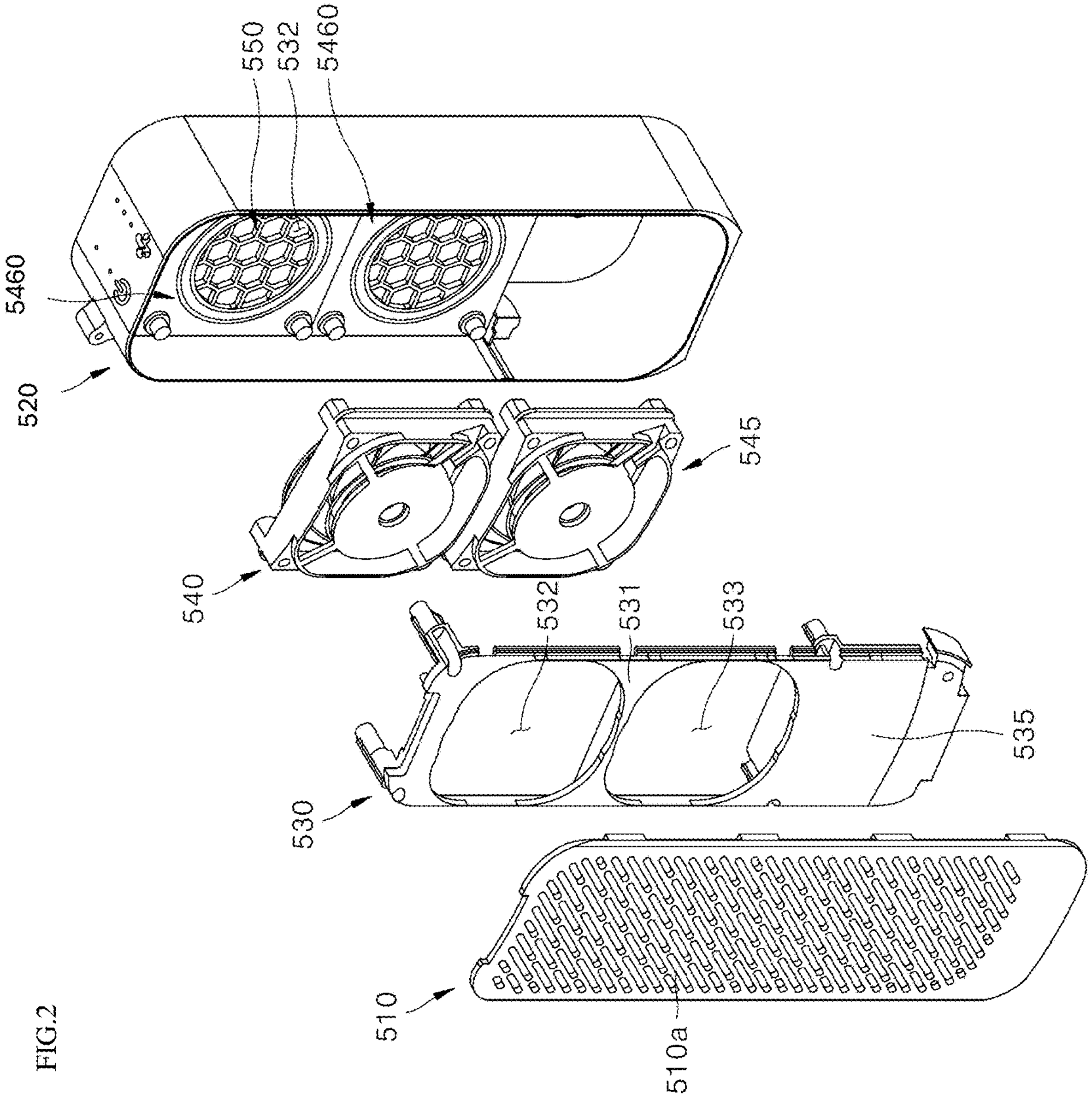
FIG. 2 is an exploded perspective view showing a state in which the portable air purifier in FIG. 1 is exploded.
Figure 3:
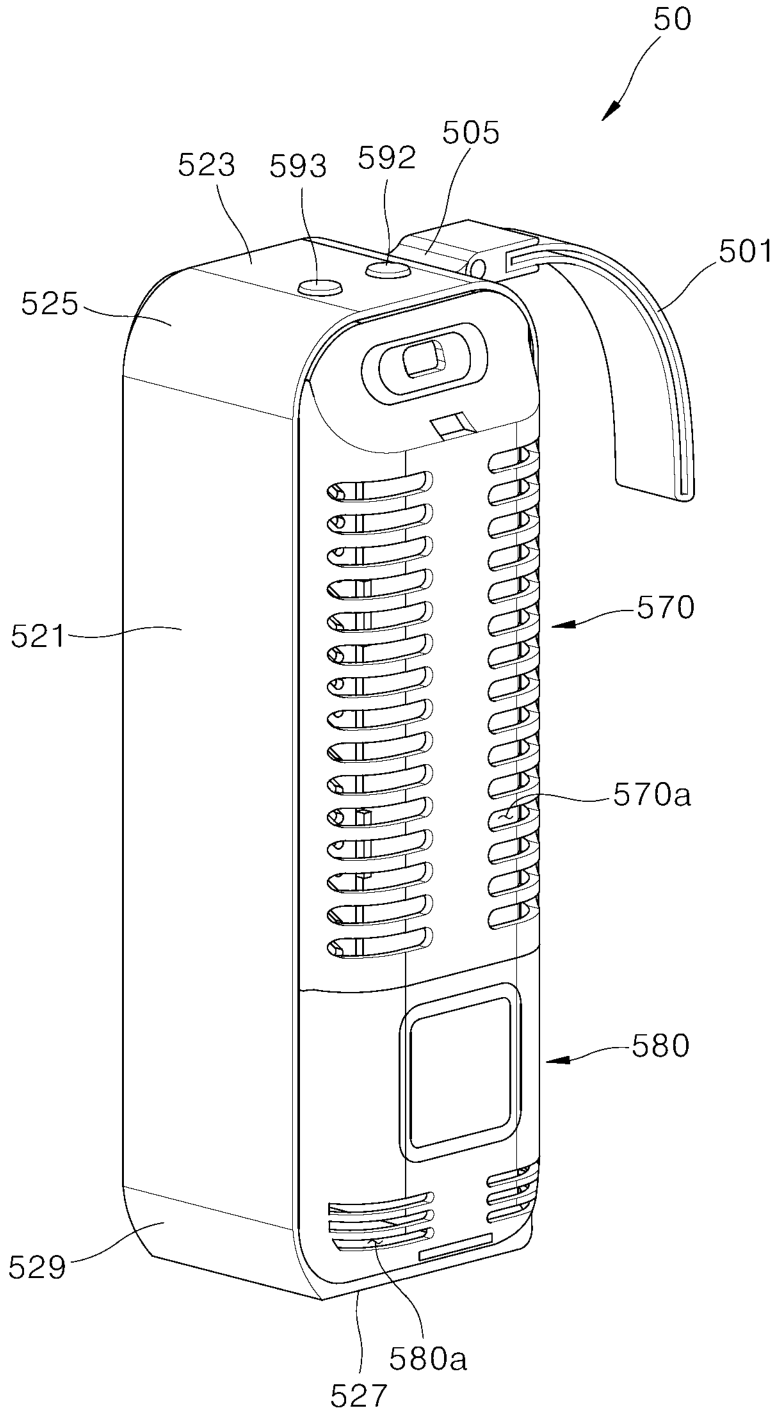
FIG. 3 is rear perspective view showing the rear surface side of the portable air purifier in FIG. 1.
Figure 4:
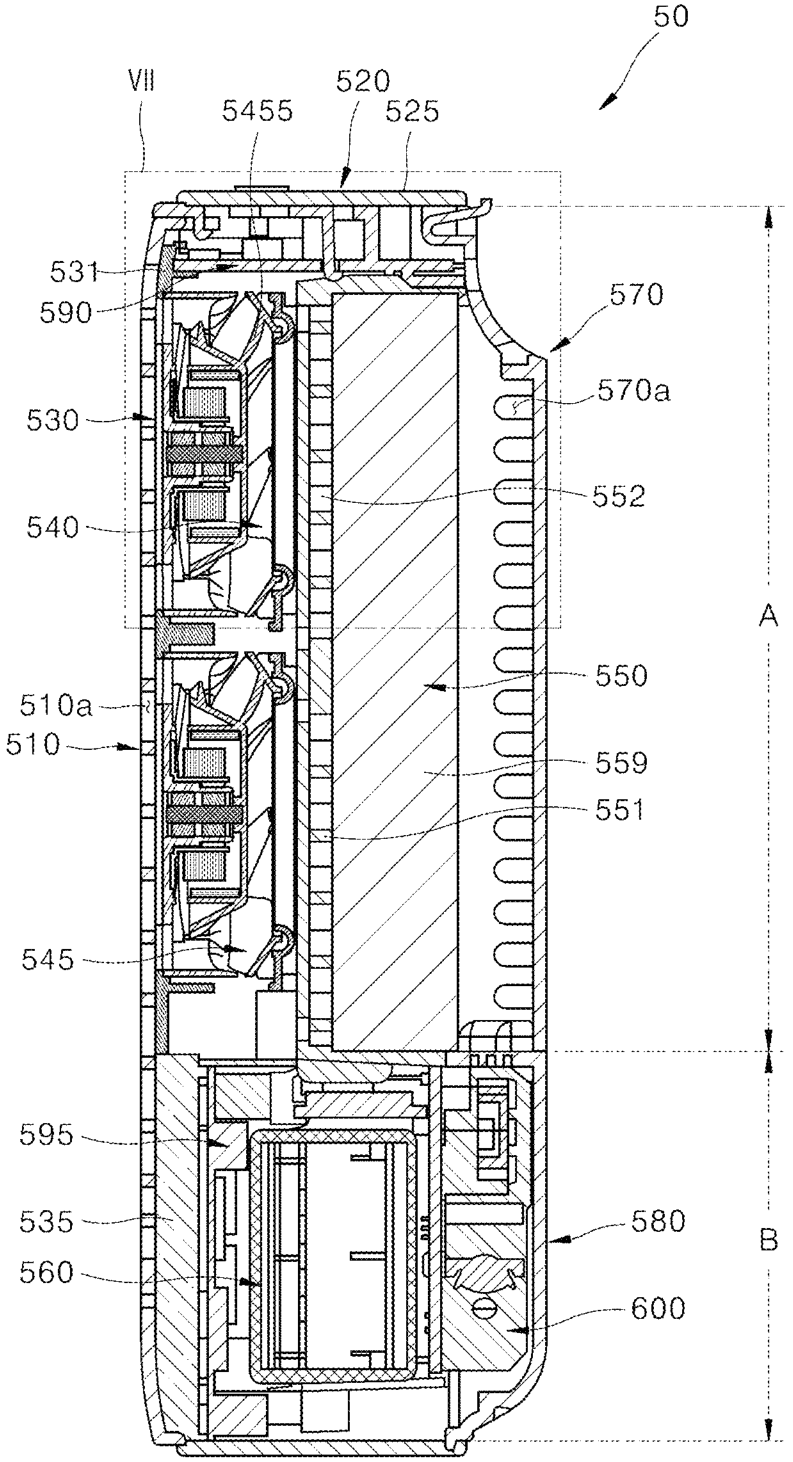
FIG. 4 is a cross-sectional view along line "IV-IV" in FIG. 1.

FIG. 1 is a front perspective view showing the front surface side of a portable air purifier of one embodiment, and FIG. 2 is an exploded perspective view showing a state in which the portable air purifier in FIG. 1 is exploded. FIG. 3 is rear perspective view showing the rear surface side of the portable air purifier in FIG. 1, and FIG. 4 is a cross-sectional view along line "IV-IV" in FIG. 1.

In the embodiment, a portable air purifier 50 is described as an example.

Referring to FIGS. 1 to 4, the portable air purifier 50 in the embodiment may be approximately formed into a cuboid. The portable air purifier 50 includes a case 520, a front surface panel 510 and a rear surface panel 570.

The case 520 forms the skeleton of the exterior of the portable air purifier 50. Various types of components are accommodated in the case 520.

Both sides of the case 520 in a first direction may be open. That is, the front and the rear of the case 520 may be open. A suction surface may be disposed on one side of the case 520 in the first direction, and a discharge surface may be disposed on the other side of the case 520 in the first direction.

For example, the suction surface may be disposed at the rear of the case 520, and the rear surface panel 570 may be disposed at the rear of the case 520, where the suction surface is disposed. Additionally, the discharge surface may be disposed at the front of the case 520, and the front surface panel 510 may be disposed at the front of the case 520, where the discharge surface is disposed.

The suction surface may indicate a virtual surface corresponding to the boundary between the inside of the case 520 and the outside of the case 520, at the rear of the case 520. The discharge surface indicates a virtual surface corresponding to the boundary between the inside of the case 520 and the outside of the case 520, at the front of the case 520.

In the embodiment, the suction surface and the discharge surface may actually be openings formed at the rear and the front of the case 520, since both the rear and the front of the case 520 are open. In the embodiment, the suction surface and the discharge surface are disposed in parallel, for example.

The front surface panel 510 is coupled to the front of the case 520. The front surface panel 510 forms the exterior of the front surface of the portable air purifier 50.

The rear surface panel 570 is coupled to the rear of the case 520. The rear surface panel 570 forms the exterior of the rear surface of the portable air purifier 50.

The portable air purifier 50 may be entirely formed into a standing cuboid that is elongated in the up-down direction. Accordingly, a user may use the portable air purifier 50 in the state in which the portable air purifier 50 stands or lies. Additionally, the portable air purifier 50 may stay in the same position reliably without rolling in a moving vehicle, even if the portable air purifier 50 is used in the state in which the portable air purifier 50 lies.

Directions are defined as follows. A direction from the case 520 to the front surface panel 510 is referred to as a front, and a direction from the case 520 to the rear surface panel 570 is referred to as a rear. At this time, a "first direction" denotes the front-rear direction. Additionally, the first direction may have the same meaning as the axial direction. The axial direction may be defined as a parallel direction with the lengthwise direction of a shaft disposed at a fan module 540 that is described below. A "second direction" is a direction perpendicular to the first direction and denotes the left-right direction. A "third direction" is a direction perpendicular to the first direction and the second direction and denotes the up-down direction.

[Entire Structure of Portable Air Purifier]

The portable air purifier 50 in the embodiment includes a front surface panel 510, a case 520, a fan cover 530, a fan module 540, 545, a filter module 550, a battery 560, a rear surface panel 570 and a rear surface cover 580.

The front surface panel 510 is disposed at the front most side of the portable air purifier 50 and forms the exterior of the front surface of the portable air purifier 50. Air purified by the portable air purifier 50 is discharged outward through the front surface panel 510. To this end, a plurality of outlets 510*a* is provided on the front surface panel 510.

The case 520 forms the skeleton of the exterior of the portable air purifier 50. The exteriors of the upper surface, lateral surfaces and lower surface of the portable air purifier 50 are formed by the case 520. Accommodation space is formed in the case 520. Various types of components such as a fan cover 530, a fan module 540, 545, a battery 550, a filter module 560 and the like, constituting the portable air purifier 50, are accommodated in the accommodation space. The case 520 has enough strength to protect the accommodated components from an external impact, for example.

The fan cover 530 is accommodated in the accommodation space of the case 520 and disposed at the front of the fan module 540, 545. That is, the fan cover 530 is disposed between the front surface panel 510 and the fan module 540, 545, inside the case 520.

The fan cover 530 fixes the fan module 540, 545 to the inside of the case 520.

Additionally, the fan cover 530 also induces air being blown by the fan module 540, 545 to flow straight toward the front, without causing the spread of the air to surrounding areas. Further, the fan cover 530 may be involved in fixing the filter module 550 and the battery 560.

The fan module 540, 545 may be accommodated in the accommodation space of the case 520, and disposed between the discharge surface and the filter module 550. Specifically, the fan module 540, 545 may be disposed between the fan cover 530 and the filter module 550. That is, the fan module 540, 545 is disposed at the rear of the fan cover 530 and the front of the filter module 550. The fan module 540, 545 suctions air from the rear of the portable air purifier 50 and discharges air to the front of the portable air purifier 50.

In the embodiment, the fan module 540, 545 includes a mixed flow fan respectively, for example. The fan module 540, 545 may suction air having passed through the filter module 550 in the axial direction and discharge the air in a direction between the axial direction and the radial direction.

The filter module 550 is accommodated in the accommodating space of the case 520 and disposed between the fan module 540, 545 and the rear surface panel 570. That is, the filter module 550 is disposed at the rear of the fan module 540, 545 and the front of the rear surface panel 570.

The filter module 550 purifies air suctioned through the rear of the portable air purifier 50. The air that is purified while passing through the filter module 550 passes through the fan module 540, 545, the fan cover 530 and the front surface panel 510 and then is discharged from the front of the portable air purifier 50.

The filter module 550 may include a filter case 551 and a filter 559.

The filter case 551 forms the skeleton of the exterior of the filter module 550. In the embodiment, the filter case 551 is formed into a cuboid, the rear surface of which is open, for example. Insertion space for accommodating the filter 559 is formed in the filter case 551. The rear of the filter case 551 is open. Accordingly, a passage for inserting the filter 559 into insertion space in a case main body part 552 is formed.

The filter 559 is mounted in the insertion space of the filter case 551. The filter case 551 may be provided with a mounting groove or a mounting projection that allows the filter 559 to be firmly mounted in the filter case 551, on the inner surface thereof.

Additionally, the filter case 551 is provided with a penetration hole 552 that forms a passage between the insertion space and the fan module 540, 545. The penetration hole 552 is formed in a way that penetrates in the front-rear direction on the front surface of the filter case 551. The penetration hole 552 forms a passage for allowing air having passed through the filter 559 to flow toward the fan module 540, 545.

A plurality of penetration holes 552 is formed on the front surface of the filter case 551, and each of the penetration holes 552 is formed in a way that penetrates in the front-rear direction on the front surface of the filter case 551.

In the embodiment, a plurality of penetration holes 552 is provided on the front surface of the filter case 551, and each penetration hole 552 is formed into a hexagon, for example. The plurality of penetration holes 552 is arranged in the form of a honeycomb. Accordingly, a honeycomb structure may be formed on the front surface of the filter case 551.

The honeycomb structure, formed on the front surface of the filter case 551 as described above, ensures improvement in the rigidity of the filter case 551, makes the filter case 551 lightweight as well as ensuring a passage for allowing air to flow.

The battery 560 is accommodated in the accommodation space of the case 520, and disposed under the fan module 540, 545 and the filter module 550. The battery 560 can supply a power source for driving the portable air purifier 50. To this end, the battery 560 may electrically connect to the fan module 540, 545, the filter module 550 and at least one of a sub printed circuit board (PCB) 590 and a main PCB 595 that are described hereafter.

Together with the rear surface cover 580, the rear surface panel 570 is disposed at the rearmost side of the case 520 and forms the exterior of the rear surface of the portable air purifier 50. The rear surface panel 570 is disposed behind the filter module 560. External air is suctioned into the portable air purifier 50 through the rear surface panel 570. To this end, the rear surface panel 570 has a plurality of first inlets 570*a*, thereon.

Additionally, together with the rear surface panel 570, the rear surface cover 580 is disposed at the rearmost side of the case 520 and forms the exterior of the rear surface of the portable air purifier 50. The rear surface cover 580 is disposed behind the battery 560. In the embodiment, the area behind the filter module 550 is covered by the rear surface panel 570.

The area behind the battery 560 is covered by the rear surface cover 580.

The rear surface cover 580 may have a second inlet 580*a*. The second inlet 580*a* is formed in a way that penetrates on the rear surface cover 580. The second inlet 580*a* forms a passage connecting among the rear of the case 520, the battery 560 and a sensor module 600. Through the second inlet 580*a*, external air may flow to the battery 560 and the sensor module 600 in a second area B.

[Structure of Case]

Figure 5:
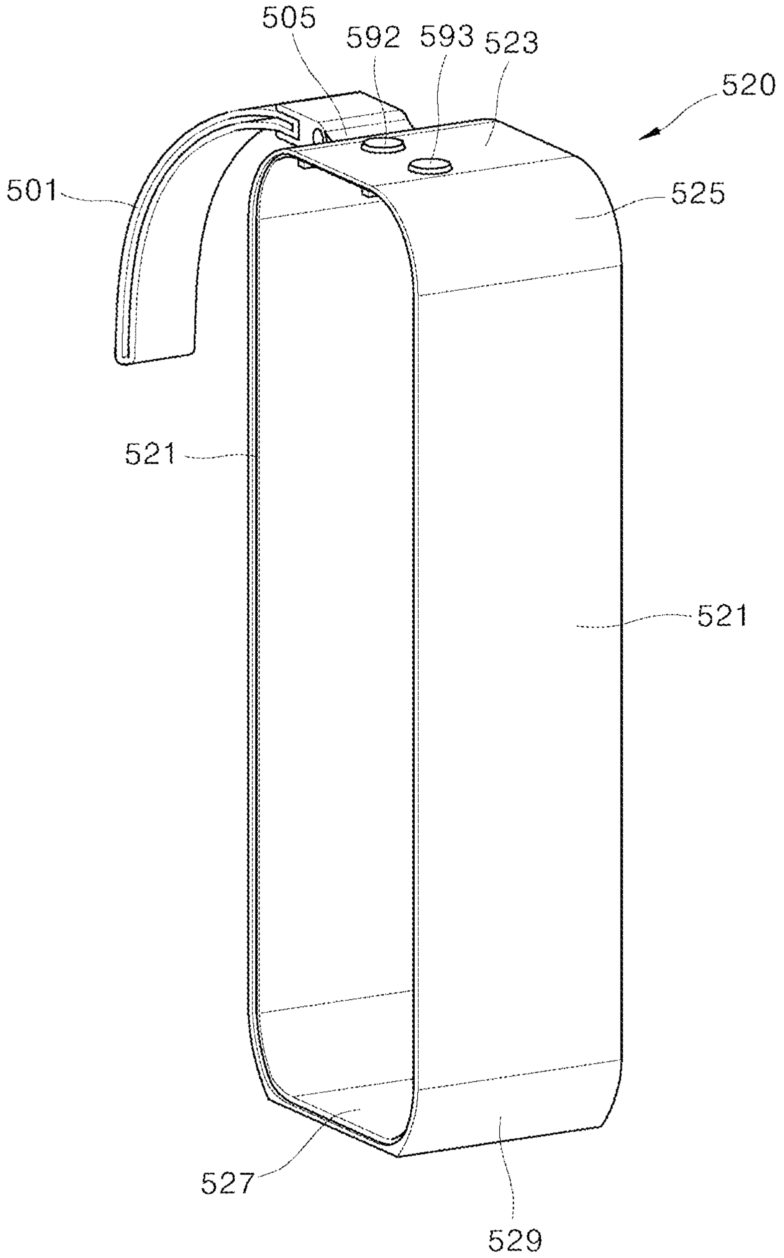
FIG. 5 is a front perspective view separately showing a case in FIG. 1.
Figure 6:
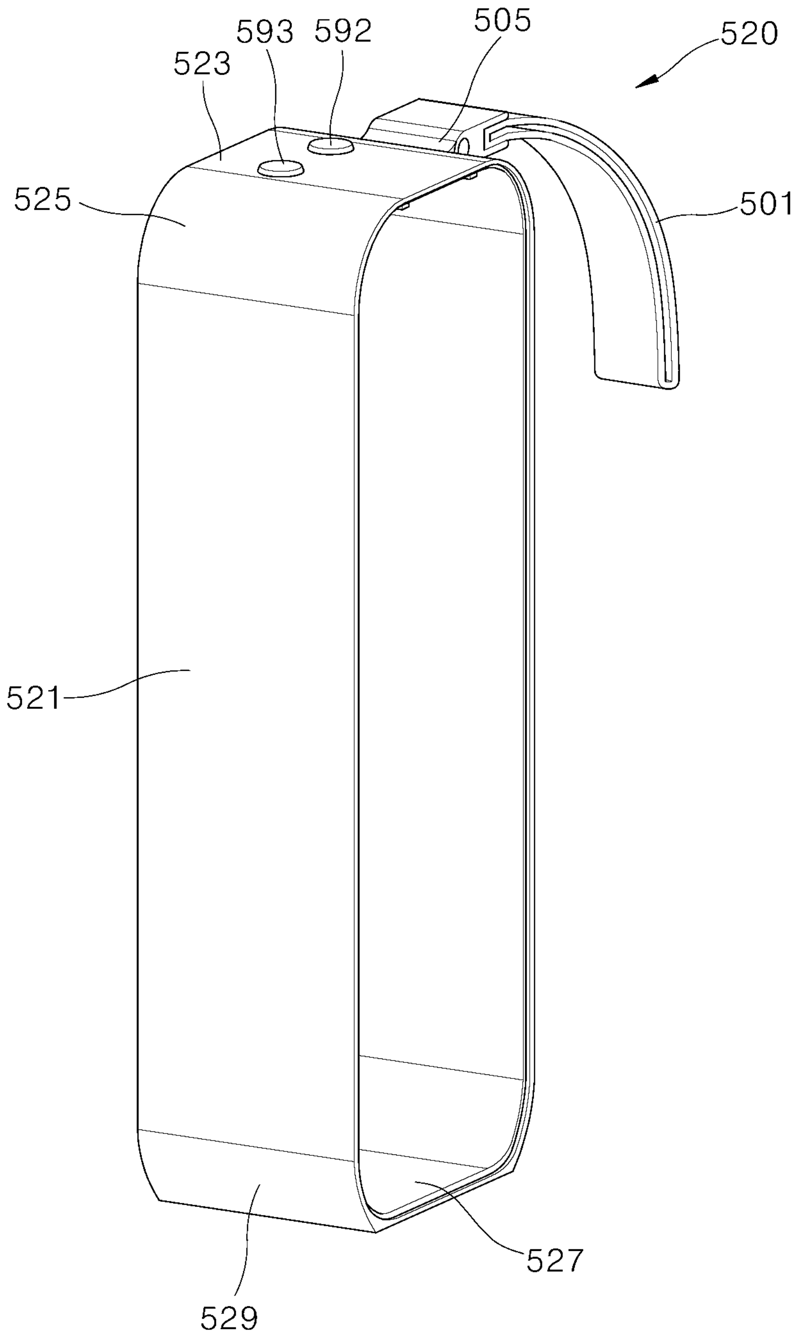
FIG. 6 is a rear perspective view separately showing the case in FIG. 1.

FIG. 5 is a front perspective view separately showing a case in FIG. 1, and FIG. 6 is a rear perspective view separately showing the case in FIG. 1.

Referring to FIGS. 3, 5 and 6, the portable air purifier 50 includes a case 520 that forms the skeleton of the exterior of the portable air purifier 50. The case 520 has accommodation space therein, and one side and the other side of the accommodation space in the first direction are open.

Directions are defined as follows. A direction from the case 520 to the front surface panel 510 is referred to as a front, and a direction from the case 520 to the rear surface panel 570 is referred to as a rear. At this time, a "first direction" denotes the front-rear direction. A "second direction" is a direction perpendicular to the first direction and denotes the left-right direction. A "third direction" is a direction perpendicular to the first direction and the second direction and denotes the up-down direction.

In the embodiment, the case 520 is formed into a cuboid having the front surface and the rear surface that are open, and therein, has accommodation space having the front and the rear that are open. The case 520 may be made of a metallic material. In the embodiment, the case 520 is made of a material such as aluminum that is lightweight and has high strength, for example.

The rear surface of the case 520 is open to suction external air. The front surface of the case 520 is open to discharge air purified in the accommodation space of the case 520. Through the open front surface and the open rear surface of the case 520, various types of components constituting the portable air purifier 50 may be installed in the accommodation space of the case 520.

A filter module 550 may be mounted in the case 520 or detached from the case 520 through the open rear surface of the case 520. The rear surface panel 570 is coupled to the open rear surface of the case 520. The rear surface panel 570 coupled to the case 520 covers the open rear surface of the case 520.

The case 520 may include a first surface part 521, a second surface part 523, a first connection surface part 525, a third surface part 527, and a second connection surface part 529, while being formed into a cuboid having the front surface and the rear surface that are open.

The first surface part 521 forms a surface in a direction that is perpendicular to the second direction perpendicular to the first direction. That is, the first surface part 521 forms a lateral surface of the case 520. The first surface part 521 is formed into a vertical flat surface that forms a wall covering a lateral portion of the accommodation space in the case 520.

The case 520 has a pair of first surface parts 521, and the first surface parts 521 face each other and are spaced a predetermined distance apart from each other. At this time, the pair of first surface parts 521 is disposed in the second direction, i.e., a direction in which the first surface parts 521 are disposed side by side in the left-right direction.

The second surface part 523 forms a surface in a direction that is perpendicular to the third direction and is disposed at one side of the pair of first surface parts 521 in the third direction. That is, the second surface part 523 is disposed in the upper portion of the first surface part 521, and forms a flat surface in a direction parallel with the direction in which the first surface parts 521 are spaced, i.e., a horizontal flat surface. The second surface part 523 forms the upper surface of the case 520.

The first connection surface part 525 is disposed between the first surface part 521 and the second surface part 523. The first connection surface part 525 is disposed respectively between the end portion of one side of the second surface part 523 and the first surface part 521 below the end portion of one side of the second surface part 523, and between the end portion of the other side of the second surface part 523 and the first surface part 521 below the end portion of the other side of the second surface part 523.

Each of the first connection surface parts 525 connects between the first surface part 521 and the second surface part 523 in a rounded manner. The first connection surface part 525 makes an upper edge of the case 520, at which the first surface part 521 and the second surface part 523 connect, round, improving the safety of a product and the aesthetic qualities of the exterior of a product.

The third surface part 527 is disposed below the second surface part 523 and the first surface part 521, and forms a flat surface parallel with the second surface part 523. The third surface part 527 forms the lower surface of the case 520. Additionally, the third surface part 527 is a portion that supports the portable air purifier 50 such that the portable air purifier 50 keeps standing.

The second connection surface part 529 is disposed between the first surface part 521 and the third surface part 527. The second connection surface part 529 is disposed respectively between the end portion of one side of the third surface part 527 and the first surface part 521 over the end portion of one side of the third surface part 527, and between the end portion of the other side of the third surface part 527 and the first surface part 521 over the end portion of the other side of the third surface part 527.

Each of the first connection surface parts 525 connects between the first surface part 521 and the second surface part 523 in a rounded manner. The first connection surface part 525 makes an upper edge of the case 520, at which the first surface part 521 and the third surface part 527 connect, round, improving the safety of a product and the aesthetic qualities of the exterior of a product.

The case 520 may have a power button 592 in the upper portion thereof, i.e., in the second surface part 523 of the case 520. The power button 592 is provided as a manipulation button for turning on/off the portable air purifier 50.

Additionally, the case 520 may have an air volume control button 593, in the upper portion thereof. The air volume control button 593 is provided as a manipulation button for increasing or decreasing the air volume of the portable air purifier 50. The air volume control button 593 may be disposed near the power button 592 such that the user identifies and manipulates the air volume control button 593 readily.

Further, the case 520 may have a strap mounting part 505 for coupling the strap 501 to the case 520. The strap 501 is provided to allow the user to hold the case 520. The user can move up the portable air purifier 50 by holding the strap 501 without directly holding the portable air purifier 50. That is, the strap 501 helps to improve the portability of the portable air purifier 50.

The accommodation space in the case 520 may be divided into a first area A and a second area B. When the accommodation space is divided in the up-down direction, the upper area is the first area A, and an area under the first area A is the second area B. The first area A and the second area B are divided conceptually rather than physically.

In the embodiment, among the components accommodated in the accommodation space, the fan modules 540, 545 and the filter module 550 are disposed in the first area A, and the battery 550 is disposed in the second area B.

[Disposition Structure of Components of Portable Air Purifier]

Referring to FIGS. 1 to 4, the accommodation space in the case 520 forming the skeleton of the portable air purifier 50 is divided into a first area A in the upper portion of the case 520 and a second area B in the lower portion of the case 520.

Components in relation to the suction, purification and discharge of air are disposed in the first area A. That is, the filter module 550 and the fan module 540, 545 are disposed in the first area A, and accordingly, air flows in the first area A. A plurality of first inlets 570*a* is provided as a passage for suctioning air, on the rear surface panel 570. An air discharge part 532, 533 and an outlet 510*a* are provided as a passage for discharging air purified in the first area A, on the fan cover 530 and the front surface panel 510. Additionally, a flow path connecting among the first inlet 570*a*, the air discharge part 532, 533 and the outlet 510*a* is formed in the first area A.

That is, the first inlet 570*a*, the filter module 550, the fan module 540, 545, the air discharge part 532, 533 and the outlet 510*a* are provided in the first area A, and a flow path for allowing air suctioned into the portable air purifier 50 to pass through the air purifier 50 is formed in the first area A.

Components that do not directly relate to an air flow for air purification are disposed in the second area B. That is, the main PCB 595, the battery 560 and the sensor module 600 are disposed in the second area B. The rear cover 580 covers the open rear of the space where the above components are disposed.

In the embodiment, the case 520 is formed in to a cuboid having a length in the up-down direction greater than a length in the lateral direction. Additionally, the up-to-down length of the first area A in the upper portion of the case 520 is greater than that of the second area B in the lower portion of the case 520. That is, when the portable air purifier 50 stands vertically, the first area A in the upper portion of the case 520 occupies more space than the second area B in the lower portion of the case 520.

A lower cover part 535 of the fan cover 530 is disposed at the frontmost side of the second area B. The battery 560 is disposed behind the lower cover part 535 while being disposed in the second area B. The fan module 540, 545 and the filter module 550 are disposed over the battery 560, and the rear surface cover 580 is disposed behind the battery 560. Additionally, the sensor module 600 may be disposed between the battery 560 and the rear surface cover 580.

That is, the upper boundary of the battery 560 is defined by the fan module 540, 545 and the filter module 550, the lateral and lower boundaries of the battery 560 are defined by the first surface part 521 and the third surface part 527 of the case 520, and the rear boundary of the battery 560 is accommodated in space defined by the rear surface cover 580.

In the embodiment, the battery 560 is a heavier object than the fan module 540, 545 and the filter module 550. It is preferable that the battery 560 weights more than a total weigh of the fan module 540, 545 and the filter module 550.

Ordinarily, since the weight per unit volume of the battery 560 is much greater than that of the fan module 540, 545 and that of the filter module 550, the battery 560 may be readily provided as a heavier object than the fan module 540, 545 and the filter module 550 although the weight or size of the battery 560 does not increase intentionally.

That is, even if a battery 560 having capacity required for the ordinary use of an portable air purifier 50 is applied to the portable air purifier 50, naturally, the battery 560 weights more than the fan module 540, 545 and the filter module 550.

When the battery 560 as a heavy object is disposed in the lower portion of the portable air purifier 50, the following effects can be produced.

First, when the battery 560 that is a heavy object is disposed in the lower portion of the portable air purifier 50, the center of gravity of the portable air purifier 50 is biased toward the lower side of the portable air purifier 50 from the up-to-down center of the portable air purifier 50. That is, the center of gravity of the portable air purifier 50 is biased toward the lower side of the portable air purifier 50, in which the battery 560 is disposed.

The bias of the center of gravity of the portable air purifier 50 toward the lower portion of the portable air purifier 50, where the battery 560 is disposed, reduces the risk of the overturning of the portable air purifier 50, when the portable air purifier 50 stands vertically.

That is, when the portable air purifier 50 stands vertically, the portable air purifier 50 rarely falls since the center of gravity of the portable air purifier 50 is at the lower side of the portable air purifier 50 because of the battery 560 in the lower portion of the portable air purifier 50.

When it comes to the portable air purifier 50 in the embodiment, the third surface part 527 of the case 520 forms a flat surface having a greater surface area than the second surface part 523 of the case 520. That is, the third surface part 527 forms a long flat surface that has a greater length in the lateral direction than the second surface part 523. That is, under the assumption that the length of the third surface part 527 in the lateral direction is d1 and that the length of the upper surface part 527 in the lateral direction is d2, the relationship d1>d1 is satisfied. Additionally, the second connection surface part 529 connecting between the third surface part 527 and the first surface part 521 forms a curved surface that has a less R value than the first connection surface part 525.

The third surface part 527 of the case 520 is a portion contacting the bottom surface of the portable air purifier 50 when the portable air purifier 50 stands vertically. That is, the third surface part 527 is a portion that supports the portable air purifier 50 such that the portable air purifier 50 keeps sanding.

Since the third surface part 527 of the case 520 forms a surface area that has a greater surface area than the second surface part 523, the third surface part 527 of the case 520 can support the portable air purifier 50 that stands vertically, more reliably.

In combination of the structure in which the battery 560 is disposed in the lower portion of the portable air purifier 50 such that the center of gravity of the portable air purifier 50 is at the lower side of the portable air purifier 50, and the structure in which the third surface part 527 of the case 520, which supports the portable air purifier 50 standing vertically, forms a flat surface that has a greater surface area than the second surface area 523, effectively suppressing the overtraining of the portable air purifier 50 and reliably keeping the portable air purifier 50 standing vertically.

Second, when the battery 560 as a heavy object is disposed in the lower portion of the portable air purifier 50, the other components such as the filter module 550 and the fan module 540, 545 constituting the portable air purifier 50 need to be disposed further upward than the battery 560. That is, components in relation to the suction, purification and discharge of air need to be disposed further upward than the battery 560.

To ensure the charge capacity of the battery 560, required for the smooth operation of the portable air purifier 50, the battery 560 needs to have a predetermined size or greater. It means that the portable air purifier 50 needs to have installation space of a predetermined size or greater, therein, to install the battery 560. Additionally, it is irrational to form a flow path for allowing an air to flow in the space where the battery 560 is installed. Accordingly, components in relation to the suction, purification and discharge of air needs to be disposed to avoid the battery 560, i.e., in a position higher than the position of the battery 560.

In the disposition structure, a flow path for the suction, purification and discharge of air is formed in the first area A higher than the position of the battery 560, in the portable air purifier 50. Thus, the suction of air into the portable air purifier 50, and the discharge of air purified in the portable air purifier 50 are performed in a position higher than the position of the battery 560.

As purified air is discharged from the upper portion of the portable air purifier 50, the air purified in the portable air purifier 50 can reach the user's face more easily.

When the portable air purifier 50 is placed and used on the bottom surface lower than the user's face, the portable air purifier 50 that stands vertically allows a greater amount of air purified in the portable air purifier 50 to reach the user's face than the portable air purifier 50 that lies horizontally.

To this end, when purified air is discharged from the upper portion of the portable air purifier 50 in the state in which the portable air purifier 50 stands vertically, a greater amount of the air purified in the portable air purifier 50 reaches the user's face.

In the embodiment, since the battery 560 is disposed in the lower portion of the portable air purifier 50, a flow path for the suction, purification and discharge of air is formed in a position higher than the position of the battery 560, in the portable air purifier 50. Accordingly, purified air is discharged from the upper portion of the portable air purifier 50, and a greater amount of the air purified in the portable air purifier 50 reaches the user's face.

That is, in the structure where the battery 560 is disposed in the lower portion of the portable air purifier 50, the structural stability of the portable air purifier 50 can improve to reduce the risk of overturning of the portable air purifier 50 that stands vertically, and an efficient flow path can also be formed to enable a greater amount of air purified in the portable air purifier 50 to reach the user's face.

Third, the structure, in which the battery 560 as a heavy object is disposed in the lower portion of the portable air purifier 50 such that components in relation to the suction, purification and discharge of air are disposed in a position higher than the position of the battery 560, may help to expand the range in which the portable air purifier 50 is installed.

In an example, when the portable air purifier 50 is used in the state of being held in a cup holder h in a vehicle, the area where air is suctioned and the area where purified air is discharged are disposed higher than the cup holder, such that the portable air purifier 50 is reliably held in vehicle while maintaining a high level of air purification performance. To this end, the up-to-down length of the second area B where the battery 560 is disposed is set to the depth of the cup holder or greater, for example.

In another example, if the lower area of the portable air purifier 50 is fixed by a tong type holder and the like, the portable air purifier 50 can be fixed stably while the portable air purifier 50's areas where air is suctioned and discharged are not blocked.

That is, components such as a battery 560 that does not directly relate to an air flow for air purification are disposed in the lower portion of the portable air purifier 50, and the portable air purifier 50 is held and fixed through its lower portion, ensuring a high level of air purification performance and a reliable fixation of the portable air purifier 50.

[Disposition Structure of Fan Module and Filter Module]

The portable air purifier 50 in the embodiment may include a fan module 540, 545 that suctions air from the rear of the portable air purifier 50 and discharges air through the front of the portable air purifier 50.

The fan module 540, 545 may be disposed between the fan cover 530 and the filter module 550. That is, the fan cover 530 may be disposed at the front of the fan module 540, 545, and the filter module 550 may be disposed at the rear of the fan module 540, 545.

While the fan module 540, 545 is accommodated in the accommodation space of the case 520, the fan module 540, 545 may be disposed in the first area A. Accordingly, the fan module 540, 545 may be disposed in a position that faces the rear surface of the upper cover part 531, out of the upper cover part 531 of the fan cover 530 and the lower cover part 535 of the fan cover 530.

In the embodiment, the portable air purifier 50 is provided with two fan modules 540, 545, for example. At this time, the portable air purifier 50 is provided with a first fan module 540 and a second fan module 545.

The first fan module 540 may be disposed between the discharge surface and the filter module 550, specifically, between the fan cover 530 and the filter module 550. At this time, the first fan module 540 may be disposed in parallel with the suction surface and the discharge surface. The second fan module 545 and the first fan module 540 may be disposed on the same surface. That is, the second fan module 545 may be disposed in parallel with the suction surface and the discharge surface, between the fan cover 530 and the filter module 550.

The positions of the first fan module 540 and the second fan module 545 are disposed not to overlap each other in the third direction. To this end, the first fan module 540 and the second fan module 545 may be disposed in the third direction, i.e., in the up-down direction. That is, the first fan module 540 and the second fan module 545 may be disposed on the same perpendicular line.

The first fan module 540 and the second fan module 545 may be disposed to face the air discharge part 532, 533 formed on the fan cover 530. Accordingly, air, suctioned into the first fan module 540 and the second fan module 545 through the rear surface panel 570, may pass through an upper air discharge part 532 and a lower air discharge part 533 respectively, and then be discharge forward through the front surface panel 510.

In the embodiment, the first fan module 540 and the second fan module 545 may have the same size and shape, for example. However, the first fan module 540 and the second fan module 545 may have a different size and shape.

The filter module 550 may be disposed between the suction surface and the fan module 540, 545. The filter module 550 includes a filter 559, and the filter 559 filters air suctioned through the suction surface.

The filter 559 may form a filter surface that forms a flat surface in a direction orthogonal to the directions in which the fan suctions and discharges air. That is, the filter 559 may form a filter surface parallel with the suction surface and the discharge surface. The suction surface, the filter surface of the filter 599 and the discharge surface may be disposed in a straight line.

Additionally, the filter 559 may form a filter surface parallel with the fan module 540, 545. The suction surface, the filter surface, the fan module 540, 545 and the discharge surface may be disposed in a straight line.

The positions of the first fan module 540 and the second fan module 545 in the first direction and the second direction may correspond to the area occupied by the filter surface.

Further, the surface areas taken up by the first fan module 540 and the second fan module 545 may correspond to the surface area of the filter surface. For example, when viewed from the front, the first fan module 540 and the second fan module 545 may be disposed to overlap the filter surface.

Furthermore, the directions of the first fan module 540 and the second fan module 545's suction of air may be the same as the directions of the suction surface and the discharge surface's disposition. That is, the first fan module 540 and the second fan module 545 may suction air respectively in the first direction or the axial direction.

The surface area occupied by the fan module 540, 545 including the first fan module 540 and the second fan module 545 described above may correspond to the surface area of the suction surface and the surface area of the filter surface. Additionally, the surface area taken by the fan module 540, 545 may correspond to the surface area of the discharge surface. Under the assumption that the suction surface, the filter surface and the discharge surface have a corresponding surface area, the surface area occupied by the fan module 540, 545 may correspond to the surface area of each of the suction surface, filter surface and discharge surface.

Accordingly, air can be suctioned and discharged by the fan module 540, 545 through the entire suction surface and the entire discharge surface.

For example, air can be suctioned by the fan module 540, 545 through the suction surface that is ensured as much surface area as the fan module 540, 545. Air suctioned through the suction surface can be filtered by the filter surface that is ensured as much surface area as the suction surface and the fan module 540, 545. Additionally, air can be discharged by the fan module 540, 545 through the discharge surface that is ensured as much surface area as the fan module 540, 545.

That is, the suction surface and the discharge surface may ensure a passage having an optimal surface area required for the fan module 540, 545 to suction and discharge air. Additionally, the filter 559 may ensure a filter surface having an optimal surface area required to filter air suctioned through the suction surface. Thus, air may flow effectively, based on the operation of the fan module 540, 545.

In the embodiment, the suction surface, the filter surface, the fan module 540, 545 and the discharge surface are disposed in parallel. Additionally, the suction surface, the filter surface, the fan module 540, 545 and the discharge surface are disposed in the first direction, and air flows in the same direction. That is, air, flowing based on the operation of the fan module 540, 545, can flow, in the same straight line, in the same direction as the direction in which the suction surface, the filter surface, the fan module 540, 545 and the discharge surface are disposed.

As air flows in a straight line, resistance against the flow of the air decreases, and the air can flow more smoothly. Accordingly, a sufficient amount of air is suctioned, and in response, a sufficient amount of air is discharged by the fan module 540, 545, leading to improvement in the air purification performance of the portable air purifier 50.

[Structure of Fan Module]

As described above, the portable air purifier 50 in the embodiment may include a plurality of fan modules 540, 545. In the embodiment, the portable air purifier 50 includes the first fan module 540 and the second fan module 545, and the first fan module 540 and the second fan module 545 have the same structure, for example. Herein, the structure of the first fan module 540 is described as an example.

Figure 7:
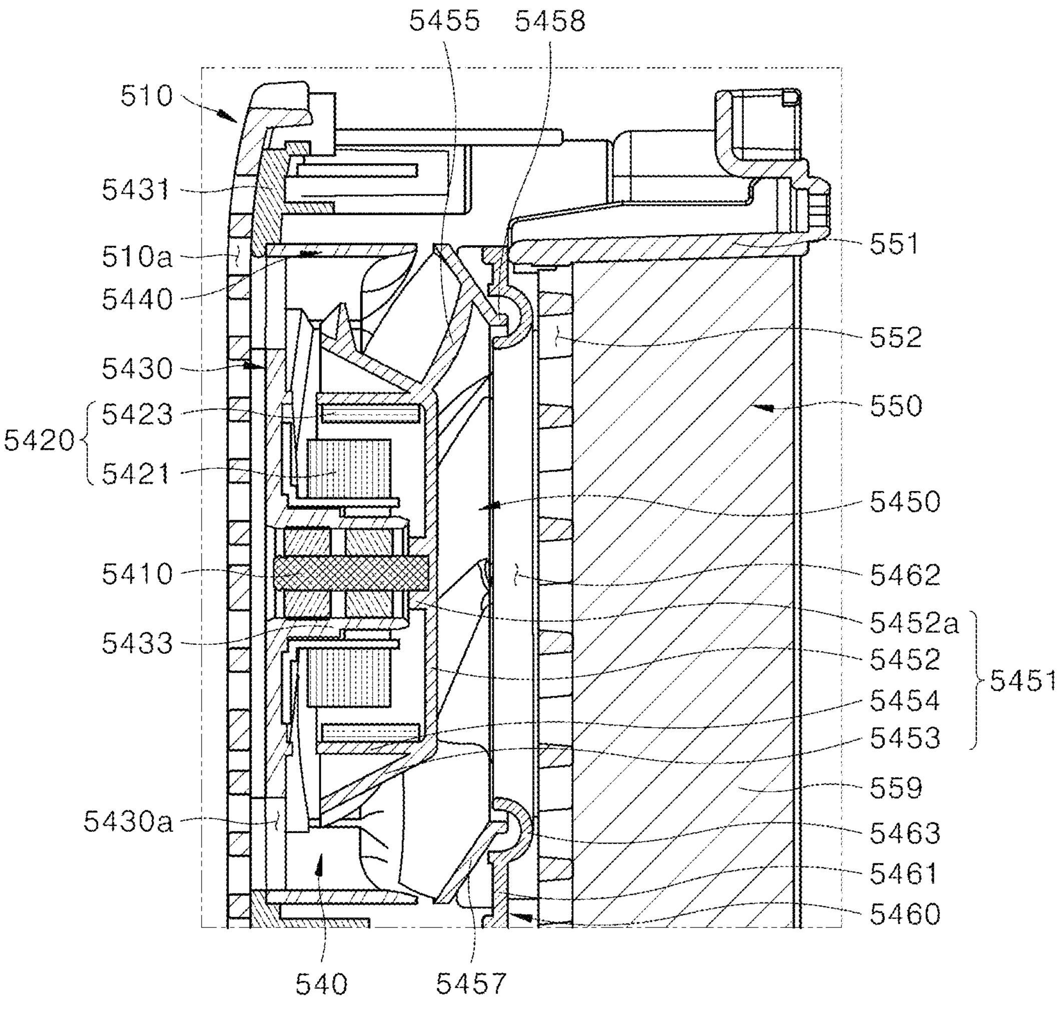
FIG. 7 is a cross-sectional view specifically showing the structure of portion "VII" in FIG. 4.
Figure 8:
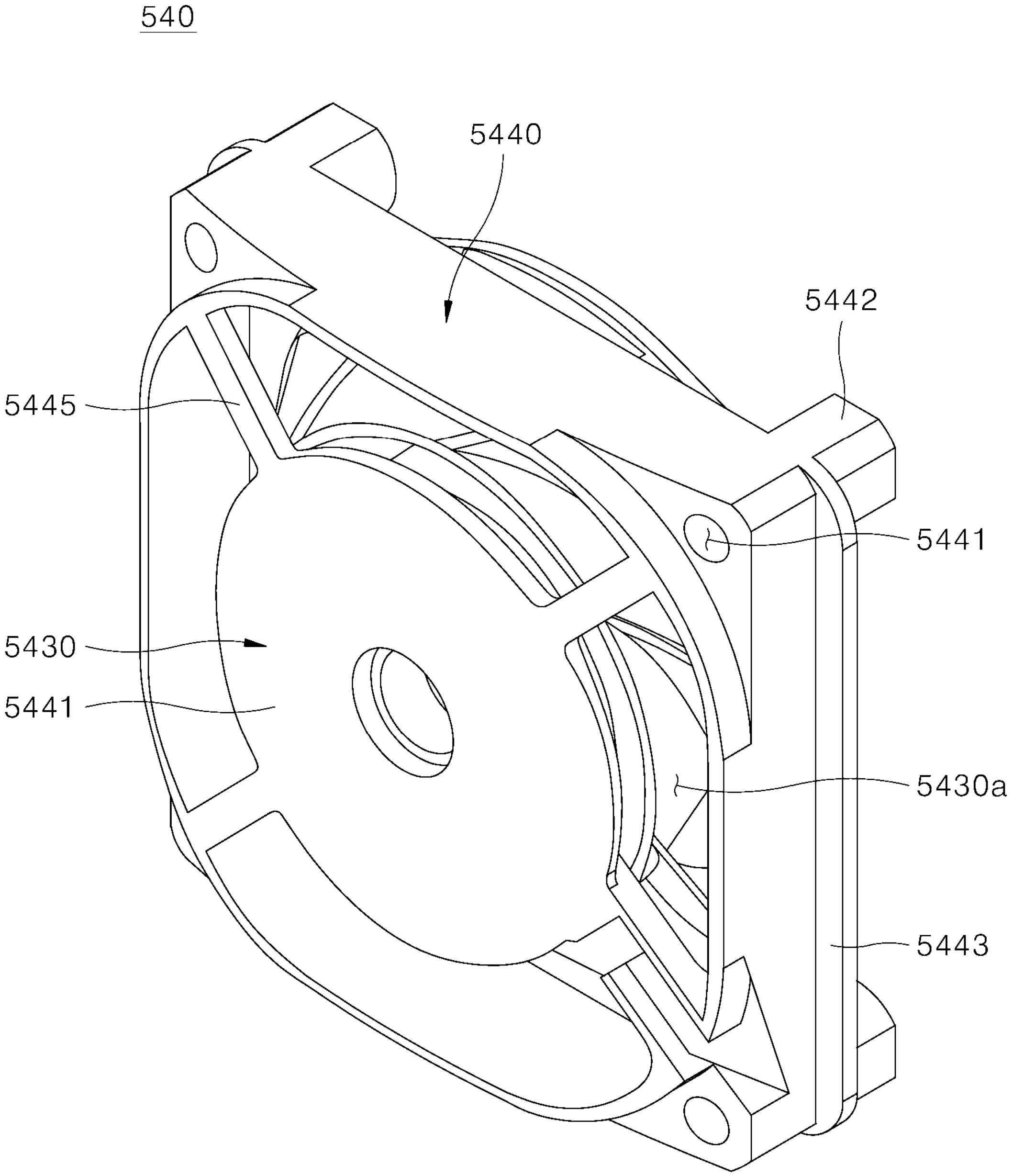
FIG. 8 is a perspective view separately showing a fan module of one embodiment.
Figure 9:
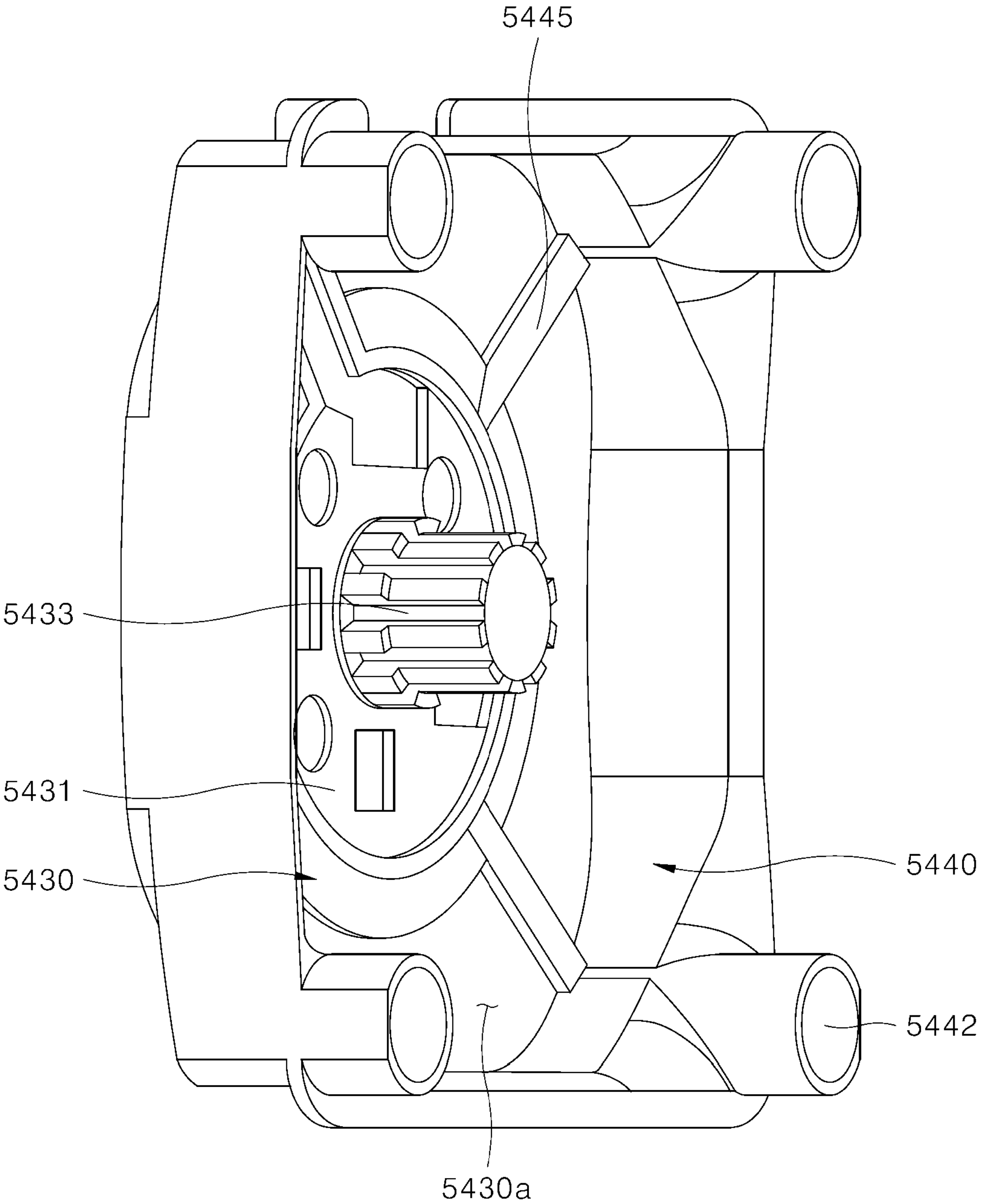
FIG. 9 is a perspective view separately showing a fan case in FIG. 8
Figure 10:
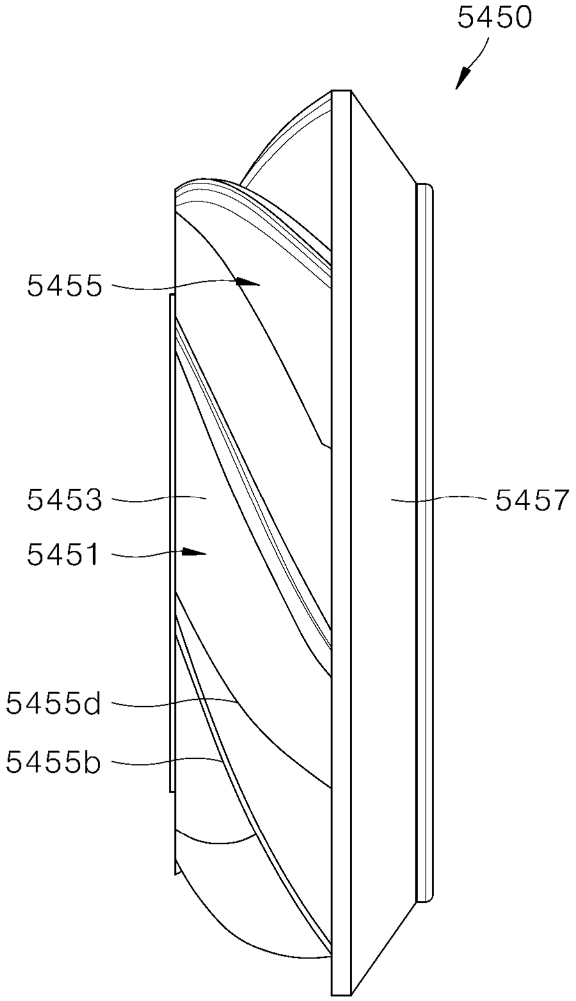
FIG. 10 is a front view separately showing the fan in FIG. 8.
Figure 11:
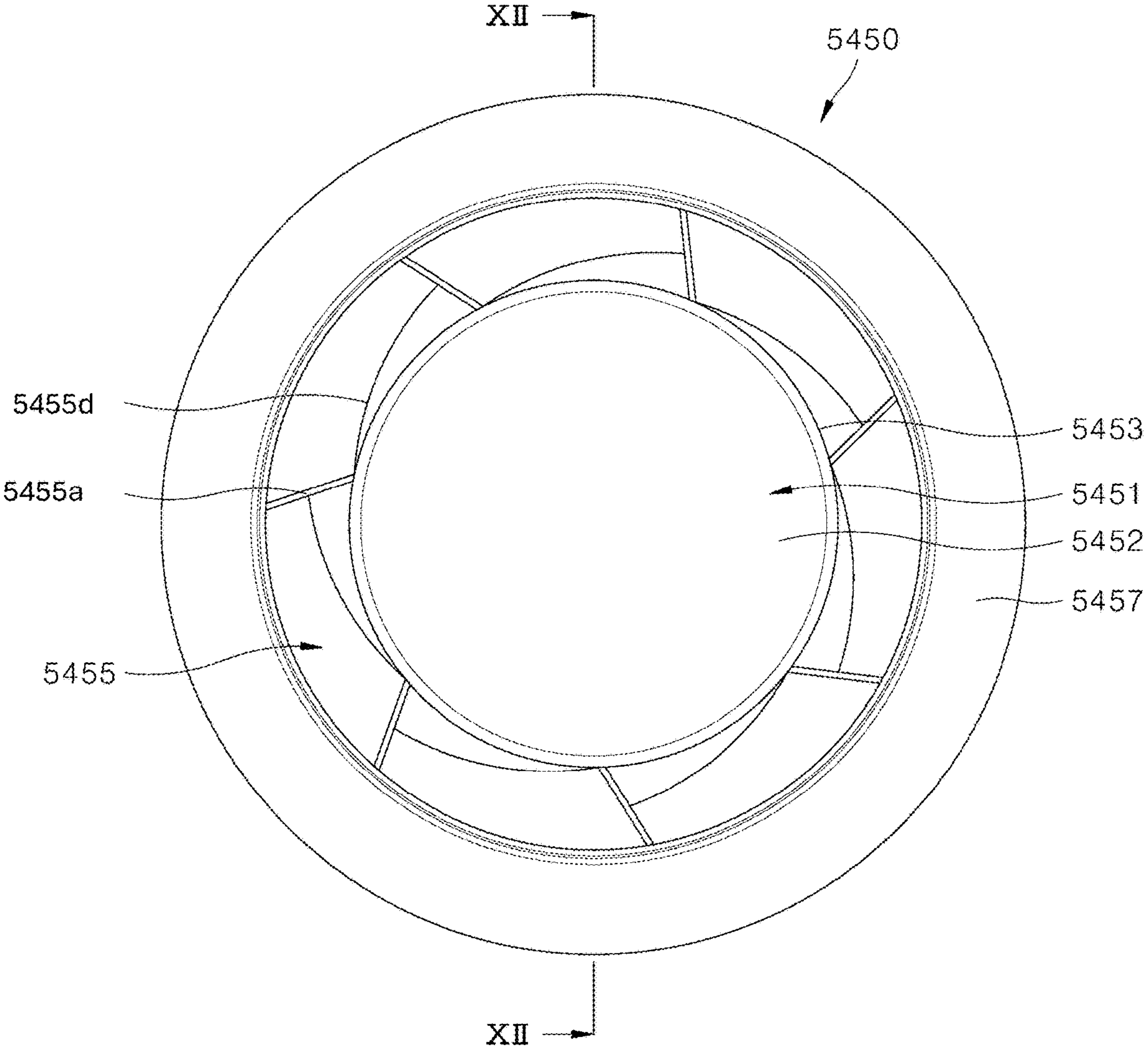
FIG. 11 is a side view showing the fan in FIG. 10.
Figure 12:
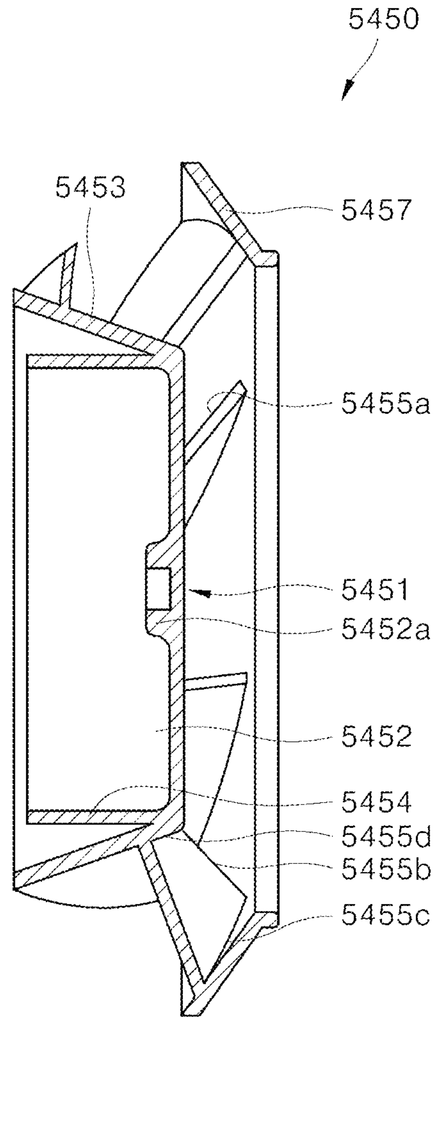
FIG. 12 is a cross-sectional view along line "X II-X II" in FIG. 11.

FIG. 7 is a cross-sectional view specifically showing the structure of portion "VII" in FIG. 4, FIG. 8 is a perspective view separately showing a fan module of one embodiment, and FIG. 9 is an perspective view separately showing a fan case in FIG. 8. FIG. 10 is a front view separately showing a fan in FIG. 8, FIG. 11 is a side view showing the fan in FIG. 10, and FIG. 12 is a cross-sectional view along line "X II-X II" in FIG. 11.

In FIG. 7, some components of the portable air purifier are omitted.

Referring to FIGS. 3, 4, 7 and 8, the first fan module 540 may include a shaft 5410, a motor 5420, a fan case 5430 and a fan 5440.

The shaft 5410 may extend in the first direction, i.e., the axial direction. One side of the shaft 5410 in the axial direction may connect to the fan 5450. The other side of the shaft 5410 in the axial direction may connect to the fan case 5430. Detailed description in relation to this is provided hereafter.

The motor 5420 connects to the fan 5450 and applies a rotational force to the fan 5450. For example, the motor 5420 may be provided in the form of a BLDC motor in which a frequency can be adjusted. The motor 5420 may include a stator 5421 and a rotor 5423.

The stator 5421 may be disposed at the center side of the motor 5420 in the radial direction of the motor 5420, and the rotor 5423 may be disposed outside the stator 5421 in the radial direction of the stator 5421. That is, the motor 5420 in the embodiment may be provided in the form of an outer motor.

The stator 5421 may be fixed to the fan case 5430, 5440. The rotor 5423 may be fixed to the fan 5450. The rotor 5423 may rotate around the shaft 5410, outside the stator 5421, and the fan 5450 may rotate together with the rotor 5423 as the rotor 5423 rotates.

The fan case 5430, 5440 may support the stator 5421 and the shaft. The fan case 5430, 5440 may include a first support part 5430 and a second support part 5440, as illustrated in FIGS. 7 to 9.

The first support part 5430 may be disposed at the center side of the fan case 5430, 5440 in the radial direction of the fan case 5430, 5440. The first support part 5430 may include a support plate 5431 and a boss 5433.

The support plate 5431 may be formed into a circular plate. The support plate 5431 may form a flat surface that is parallel with at least any one of the suction surface, the filter surface and the discharge surface. The boss 5433 may protrude in the axial direction toward the fan 5450 from the support plate 5431. In the embodiment, the boss 5433 is disposed at the center of the support plate 5431 in the radial direction of the support plate 5431, for example.

The stator 5421 may be installed in the first support part 5430. The stator 5421 may be coupled to the boss 5433 while surrounding the boss 5433 from the outside in the radial direction. That is, the stator 5421 and the boss 5433 may be coupled in a way that the boss 5433 is fitted into the stator 5421 in the axial direction. The support plate 5431 may support the boss 5433 coupled to the stator 5421 at one side of the boss 5433 in the lateral direction, as described above.

Additionally, one side of the stator 5421 coupled to the boss 5433 in the axial direction of the stator 5421 may face the support plate 5431. While one side of the stator 5421 in the axial direction of the stator 5421 contacts the support plate 5431, the stator 5421 and the support plate 5431 may be coupled. Certainly, the stator 5421 may be installed in the first support part 5430 in a way that the stator 5421 is spaced from the support plate 5431.

Further, the boss 5433 may have a hollow hole, therein. The shaft 5410 may be inserted into the boss 5433 through the hollow hole. The shaft 5410 may pass through the boss 5433 in the axial direction and protrude from the boss 5433, and connect to a below-described hub 5451 of the fan 5450, outside the boss 5433.

A bearing 5435 may be inserted into the boss 5433 having the hollow hole. The shaft 5410 may be coupled to the bearing 5435, in the boss 5433. Accordingly, the shaft 5410 may be rotatably supported by the bearing 5435. In the embodiment, a pair of bearings 5435 is spaced a predetermined distance apart from each other in the axial direction, for example. The bearing 5435, disposed as described above, may help to install the shaft 5410 rotatably in the boss 5433 in a more reliable manner.

The second support part 5440 may support the first support part 5430, and couple the first fan module 540 to at least any one of the fan cover 530 and the filter module 550.

The second support part 5440 may be disposed outside the first support part 5430 in the radial direction of the first support part 5430. The second support part 5440 may support the first support part while surrounding the first support part 5430 from the outside in the radial direction.

The second support part 5440 may be formed into an approximate rectangle. For example, the length of the second support part 5440 in the second direction may be determined to correspond to the length of the filter module 550 in the second direction.

Additionally, the length of the second support part 5440 in the third direction may be determined to correspond to half the length of the filter module 550 in the third direction. That is, if a pair of second support parts 5440 is disposed in the third direction, the exterior shapes of the pair of second support parts 5440 and the filter module 550 may be approximately aligned, when viewed from the front.

The second support part 5440 may have a hollow hole, therein. The hollow hole of the second support part 5440 may be formed in a way that the hollow hole penetrates the inside of the second support part 5440 in the axial direction. The hollow hole may have a radius greater than a radius of the support plate 5431. That is, a hollow hole bigger than the support plate 5431 is formed in the second support part 5440, and the support plate 5431 may be disposed in the second support part 5440.

Accordingly, the second support part 5440 may be spaced a predetermined distance apart from the first support part 5430, specifically, from the support plate 5431 in the centrifugal direction.

A fan outlet 5430*a* may be formed between the support plate 5431 and the second support part 5440 that are spaced as described above. The fan outlet 5430*a* may form a passage allowing air having flown into the first fan module 540 to pass through the first fan module 540 and escape from the first fan module 540.

The fan case 5430, 5440 may further include a connection part 5445. The connection part 5445 may extend from the support plate 5431 in the centrifugal direction and connect to the second support part 5440. The connection part 5445 may connect between the support plate 5431 and the second support part 5440 and help the second support part 5440 to support the support plate 5431.

In the embodiment, a plurality of connection parts 5445 may be disposed between the support plate 5431 and the second support part 5440. Additionally, each of the connection parts 5445 may have a width less than the length of the connection part 5445 in the radial direction. Each of the connection parts 5445, formed as described above, may be spaced at a predetermined interval along the circumferential direction of the support plate 5431.

Accordingly, while the fan outlet 5430*a* is formed between the support plate 5431 and the second support part 5440, the fan outlet 5430*a* may be respectively formed among the plurality of connection parts 5445.

Additionally, the connection part 5445 may provide a passage through which an electric wire, connected to the stator 5421 on the support plate 5431, passes. The electric wire connecting to the stator 5421 may be withdrawn toward the second support part 5440 side through the area where the connection part 5445 is disposed. At this time, the electric wire may pass through the fan outlet 5430*a* area in the state being covered by the connection part 5445, and connect between the stator 5421 and the main PCB 595 (see FIG. 3). When viewed from the front, the electric wire that is withdrawn from the stator 5421 and passes through the fan outlet 5430*a* area is cover by the connection part 5445 and is not be seen.

The second support part 5440 may be provided with a side rib 5443. The side rib 5443 may be disposed at at least any one of both sides of the second support part 5440 in the second direction of the second support part 5440. The side rib 5443 may protrude from a lateral portion of the second support part 5440 in the second direction of the second support part 5440.

The length of the side rib 5443 in the second direction may be set to correspond to the length of the second support part 5440 in the second direction. Additionally, the length of the side rib 5443 in the first direction may be less than the length of the first support part 5430 in the first direction. That is, the side rib 5443 may have a thickness less than that of the first support part 5430. For example, the side rib 5443 may have a thickness that is one fourth or less of the thickness of the first support part 5430.

The side rib 5443 may be biased toward the front or the rear of the second support part 5440 while protruding from the second support part 5440. In the embodiment, the side rib 5443 is biased toward the rear of the second support part 5440, for example.

As the fan module 540, 545 is inserted into the case 520, the side rib 5443 may contact both lateral surfaces of the case 520, i.e., the inner surfaces of the first surface parts 521. Accordingly, predetermined space may be formed between a lateral surface of the second support part 5440 and the first surface part 521.

The formed space may be used as space for allowing an electric wire to pass. For example, an electric wire connecting to the sub PCB 595 disposed on the fan module 540, 545 may pass through the space and connect to the stator 5421 of the motor 5420.

Referring to FIGS. 7 and 10 to 12, the fan 5450 may include a hub 5451 and fan blade 5455.

The hub 5451 is disposed at the center of the fan 5450 in the radial direction of the fan 5450, and rotates together with the rotor 5423 and the shaft. The hub 5451 may include a first fan module 540, 545 and a skirt part 5433.

The first fan module 540, 545 may be formed into a circular plate parallel with the support plate 5431. The first fan modules 540, 545 may be disposed in parallel with the support plate 5431 with the boss 5433 between the first fan modules 540, 545.

The first fan module 540, 545 may be provided with a shaft coupling part 5452*a*. The shaft coupling part 5452*a* may be disposed at the center of the first fan module 540, 545 in the radial direction of the first fan module 540, 545. The shaft coupling part 5452*a* may protrude in the axial direction toward the boss 5433 from the first fan module 540, 545.

The shaft coupling part 5452*a* may be coupled to the end portion of the shaft 5410 in the axial direction of the shaft 5410. For example, the shaft coupling part 5452*a* may be coupled to the shaft 5410 in a way that the shaft 5410 is fitted into the shaft coupling part 5452*a*. The shaft 5410 may be fixed to the shaft coupling part 5452*a* or rotatably coupled to the shaft coupling part 5452*a*.

The skirt part 5453 may protrude toward the support plate 5431 from the edge of the hub plate part 5452. The skirt part 5453 may form a slant surface that inclines in the centrifugal direction as the skirt part 5452 becomes farther from the hub plate part 5452 in the axial direction. For example, the shape in which the hub plate part 5452 and the skirt part 5453 connect may be a truncated cone shape which has a hollow hole therein and one side of which is open. The skirt part 5433 may be disposed outside the stator 5421 in the radial direction of the stator 5421. That is, the stator 5421 may be disposed in space surrounded by the skirt part 5453 and the hub plate part 5452.

The fan blade 5455 may protrude from the hub 5451 in the centrifugal direction. The fan 5450 may be provided with a plurality of fan blades 5455, and the fan blades 5455 may be spaced a predetermined distance apart from one another along the circumference direction of the hub 5451.

Specifically, the fan blade 5455 may protrude from the skirt part 5453 in the centrifugal direction. At this time, the inside of the fan blade 5455 in the radial direction thereof may connect to the skirt part 5453, and the outside of the fan blade 5455 in the radial direction thereof may connect to a shroud 5457 that is described hereafter. That is, the skirt part 5453 is a portion of the hub 5451, which directly connects to the fan blade 5455 and directly contacts air passing through the first fan module 540. The skirt part 5453 may closely relate to a flow path of air passing through the first fan module 540.

The fan 5450 may further include a shroud 5457. The shroud 5457 may be spaced a predetermined distance apart from the hub 5451 in the radial direction, outside the hub 5451 in the radial direction thereof. The shroud 5457 may be spaced from the hub 5451 by a distance corresponding to the length of the fan blade 5455 in the radial direction of the fan blade 5455. Additionally, each of the fan blades 5455 may connect between the hub 5451, specifically, the skirt part 5453 and the shroud 5457.

The shroud 5457 may form a slant surface that inclines in the centripetal direction as the shroud 5457 becomes farther from the fan case 5430, 5440 in the axial direction, i.e., toward the rear. For example, the shroud 5457 may form a slant surface that is approximately parallel with the skirt part 5453. In the embodiment, a gap between the skirt part 5453 and the shroud 5457 increases further toward the front, for example.

Each of the fan blades 5455, connecting between the shroud 5457 and the skirt part 5433, may include a leading edge 5455*a*, a trailing edge 5455*b*, a shroud chord 5455*c* and a hub chord 5455*d*.

The leading edge 5455*a* may be disposed at the front end of the fan 5450 in a rotation direction and formed in a straight manner. The rotation direction is defined as a direction in which the fan 5450 rotates. The leading edge 5455*a* may be formed into a straight line that is disposed at the front end of the fan 5450 in the rotation direction of the fan 5450 and extends in the radial direction.

The trailing edge 5455*b* may be disposed at the rear end of the fan in the rotation direction and formed in a straight manner. The trailing edge 5455*b* may be formed into a straight line that extends in a direction between the axial direction and the radial direction.

The shroud chord 5455*c* may connect one end of the leading edge 5455*a* and one end of the trailing edge 5455*b*. The shroud chord 5455*c* may extend from the inner circumferential surface of the shroud 5457.

The hub chord 5455*d* may connect the other end of the leading edge 5455*a* and the other end of the trailing edge 5455*b*. The hub chord 5455*d* may extend from the outer circumferential surface of the hub 5451.

Additionally, one end of the leading edge 5455*a* and one end of the trailing edge 5455*b* may connect to the inner circumferential surface of the shroud 5457. The other end of the leading edge 5455*a* and the other end of the trailing edge 5455*b* may connect to the outer circumferential surface of the skirt part 5453.

One end of the leading edge 5455*a* may be disposed closer to the center of the hub plate part 5452 in the radial direction of the hub plate part 5452 than one end of the trailing edge 5455*b*. The other end of the leading edge 5455*a* may be disposed closer to the center of the hub plate part 5452 in the radial direction of the hub plate part 5452 than the other end of the trailing edge 5455*b*, since one end and the other end of the leading edge 5455*a* is disposed further forward than one end and the other end of the trailing edge 5455*b* in the rotation direction, and the radius of the skirt part 5453 decreases further toward the front in the rotation direction.

Additionally, the hub 5451 may include an inner projection part 5454. The inner projection part 5454 may protrude toward the support plate 5431 from the hub plate part 5452. In the embodiment, the inner projection part 5454 and the skirt part 5453 protrude from the same point on the hub plate part 5452, e.g., from the edge of the hub plate part 5452, for example.

The inner projection part 5454 may be formed in a way that the inner projection part 5454 extends from the hub plate part 5452 in the axial direction. For example, the shape in which the hub plate part 5452 and the skirt part 5453 connect may be a cylinder shape which has a hollow hole therein and one side of which is open.

The inner projection part 5454 may be disposed between the skirt part 5453 and the stator 5421. That is, the stator 5421 may be disposed in space surrounded by the inner projection part 5454 and the hub plate part 5452.

The rotor 5423 may be disposed between the inner projection part 5454 and the stator 5421. The rotor 5423 may be fixed onto the inner circumferential surface of the inner projection part 5454. That is, the stator 5421 may be fixed to the fan case 5430, 5440, and the rotor 5423 may be fixed to the fan 5450. Accordingly, the fan 5450 may rotate together with the rotor 5423 as the rotor 5423 rotates.

In the embodiment, the fan blade 5455 may connect to the skirt part 5453 of the hub 5451. To induce the flow of air flowing into the fan module 540, 545 in a direction between the axial direction and the radial direction, the skirt part 5453 forms a slant surface that inclines in a direction between the axial direction and the radial direction.

Since the skirt part 5453 is formed at a slant, it is difficult to fix the rotor 5423 to the inner circumferential surface of the skirt part 5453. For example, for the rotor 5423 to be fixed to the inner circumferential surface of the skirt part 5453, the rotor 5423 needs to be entirely formed into an approximate truncated cone having a hollow hole since the shape of the outer circumferential surface of the rotor 5423 needs to correspond to the shape of the inner circumferential surface of the skirt part 5453. However, the shape of the rotor 5423 may be inappropriate for the reliable driving of the motor 5420.

Considering the fact, in the embodiment, the inner projection part 5454 is provided between the skirt part 5453 and the stator 5421. The inner projection part 5454 may provide a fixation surface that allows the rotor 5423 to be fixed stably to the inside of the hub 5451 when the rotor 5423 is entirely formed into a cylinder having a hollow hole.

Additionally, the inner projection part 5454 may form a structure for improving the rigidity of the hub 5451, in the hub 5451. The inner projection part 5454 may help to improve the rigidity of the entire fan 5450 effectively while suppressing a significant increase in the weight of the entire fan 5450.

[Structure of Coupling Between Fan Module and Fan Cover]

Figure 13:
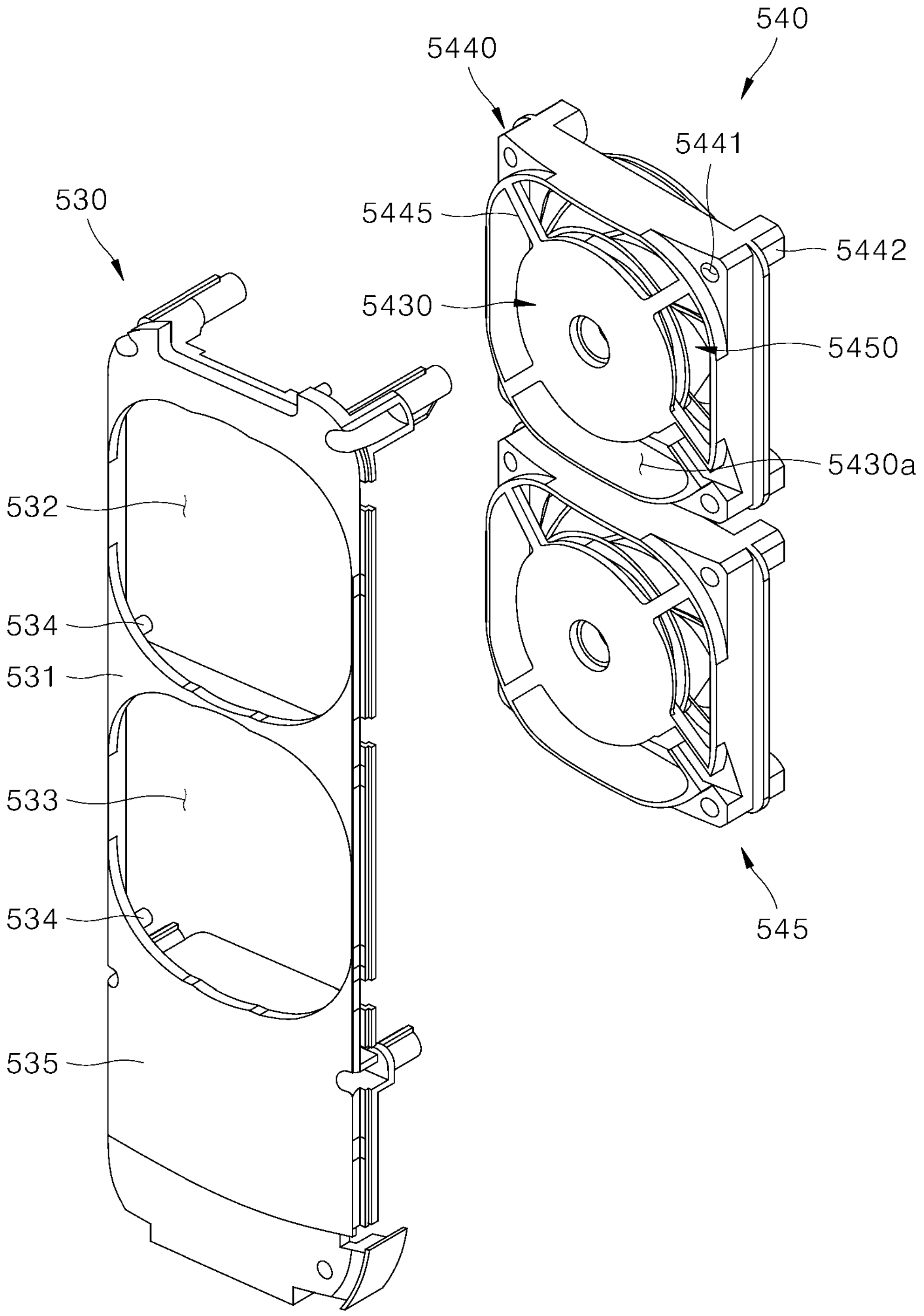
FIG. 13 is an exploded perspective view separately showing a fan cover and a fan module.

FIG. 13 is an exploded perspective view separately showing a fan cover and a fan module.

Referring to FIG. 13, the fan cover 530 may include an upper cover part 531 and a lower cover part 535.

The upper cover part 531 is disposed at the front of the fan module 540, 545. The upper cover part 531 may be provided with an air discharge part 532, 533. The air discharge part 532, 533 may be formed in a way that a portion of the upper cover part 531 penetrates or is cut. The air discharge part 532, 533 may form a passage that connects between the front of the case 520, i.e., the discharge surface, and the fan 5450 of the fan module 540, 545, on the fan cover 530.

In the embodiment, the portable air purifier 50 is provided with two fan modules 540, 545, for example. That is, the first fan module 540 and the second fan module 545 are disposed vertically in the accommodation space of the case 520.

Accordingly, the fan cover 530 may also be provided with two air discharge parts 532, 533. That is, an upper air discharge part 532 and a lower air discharge part 533 may be disposed vertically at the upper cover part 531.

Air having passed through the first fan module 540 is discharged forward through the upper air discharge part 532, and air having passed through the second fan module 545 may be discharged forward through the lower air discharge part 533.

In another example, the portable air purifier may be provided with one fan assembly or three or more fan assemblies, and accordingly, the fan cover may be provided with one air discharge part or three or more air discharge parts.

Additionally, the upper cover part 531 may be provided with a first fastening projection 534. The first fastening projection 534 may protrude from the rear surface of the upper cover part 531 rearward. In response, the fan case 5430, 5440 may be provided with a fastening hole 5441. The fastening hole 5441 may be formed in a way that penetrates in the front-rear direction in the second support part 5440.

In an example, a total of four fastening holes 5441 may be provided, and each of the fastening holes 5441 may be disposed at each edge of the second support part 5440. The first fastening projection 534 may be disposed respectively in positions corresponding to the positions of the fastening holes 5441.

Each of the first fastening projections 534 may be inserted into the fastening hole 5441 and fitted into and coupled to the second support part 5440. As a result of the coupling between the first fastening projection 534 and the second support part 5440, the fan cover 530 and the fan module 540, 545 may be coupled at a plurality of points.

As the fan cover 530 and the fan module 540, 545 are coupled, the fan module 540, 545 may be fixed to the rear of the fan cover 530. At this time, the fan module 540, 545 may be fixed in the position where the fan outlet 5430*a* formed at the front of the fan module 540, 545 overlaps the air discharge part 532, 533 formed at the fan cover 530 in the first direction. Thus, a straight line passage may be formed to allow air discharged from the fan module 540, 545 to pass through the fan cover 530.

[Structure of Fan Base]

Figure 14:
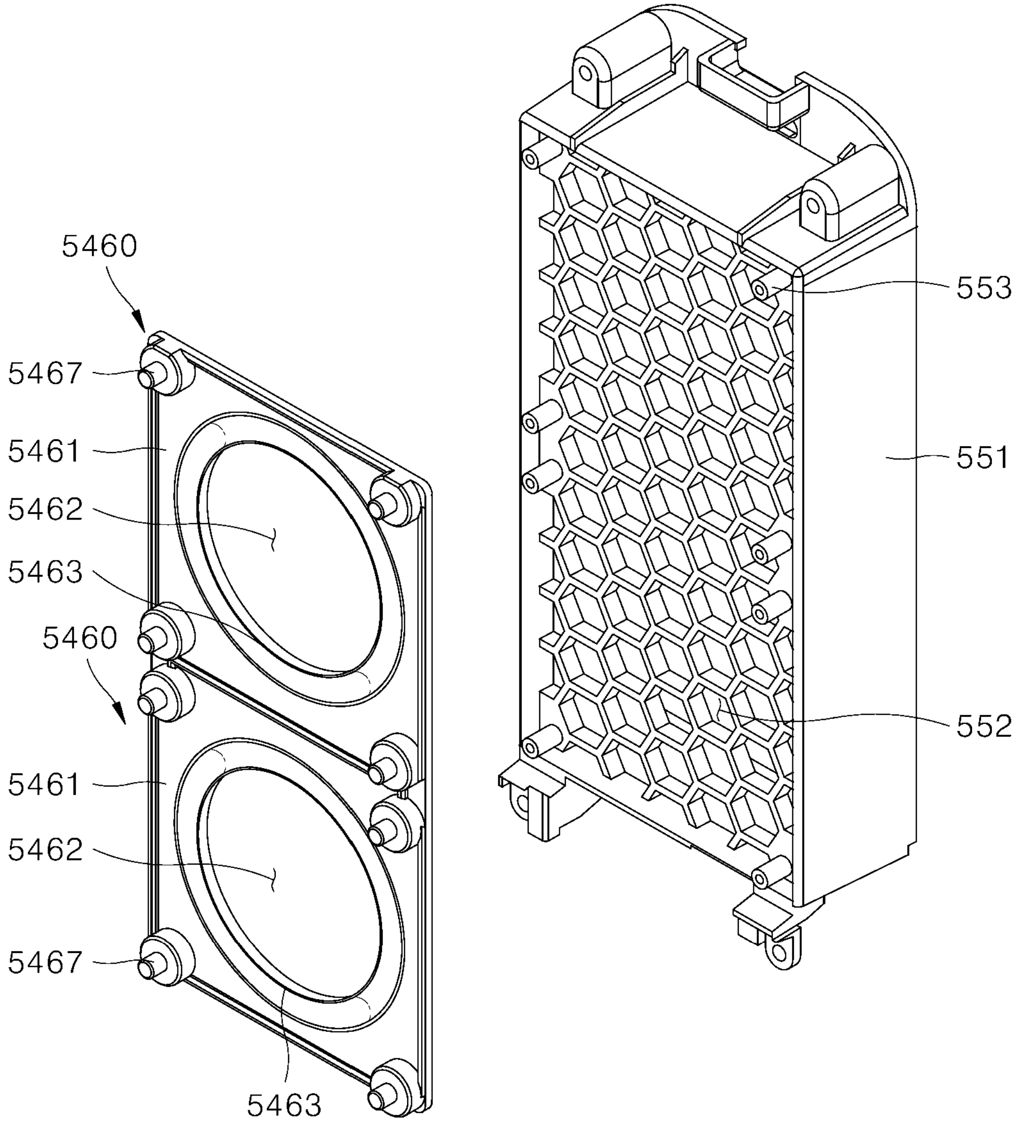
FIG. 14 is an exploded perspective view separately showing a fan module, a fan base and a filter.
Figure 15:
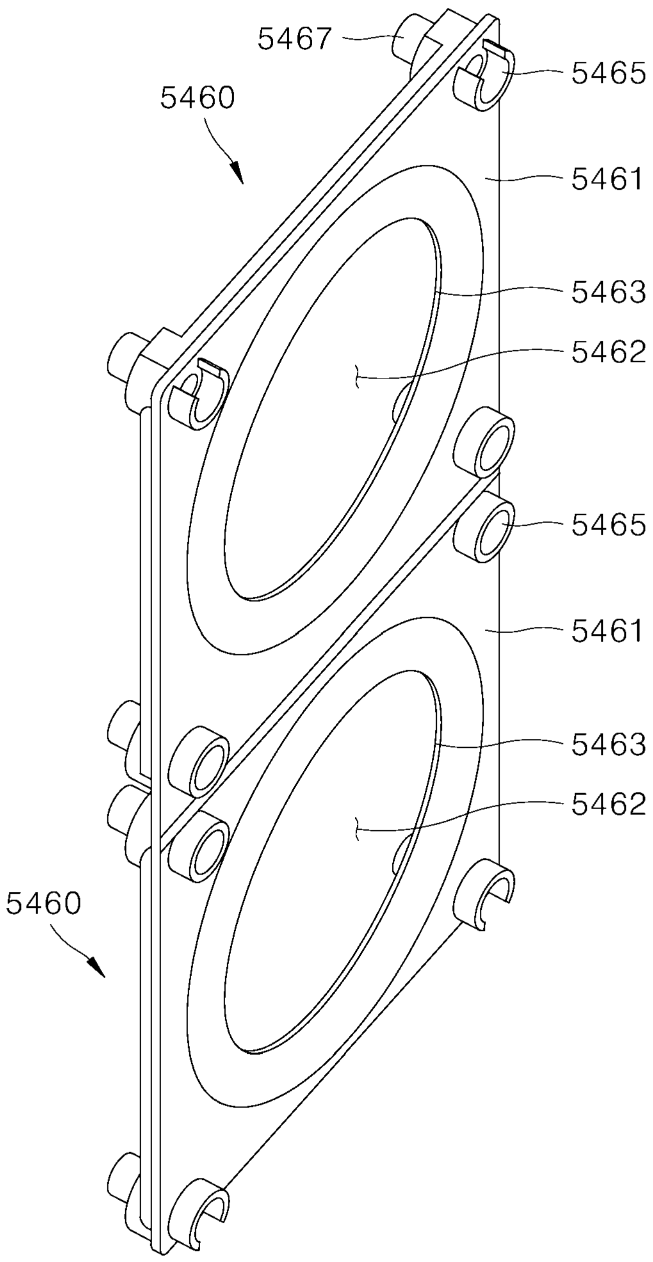
FIG. 15 is a rear perspective view showing the rear surface of a fan base.
Figure 16:
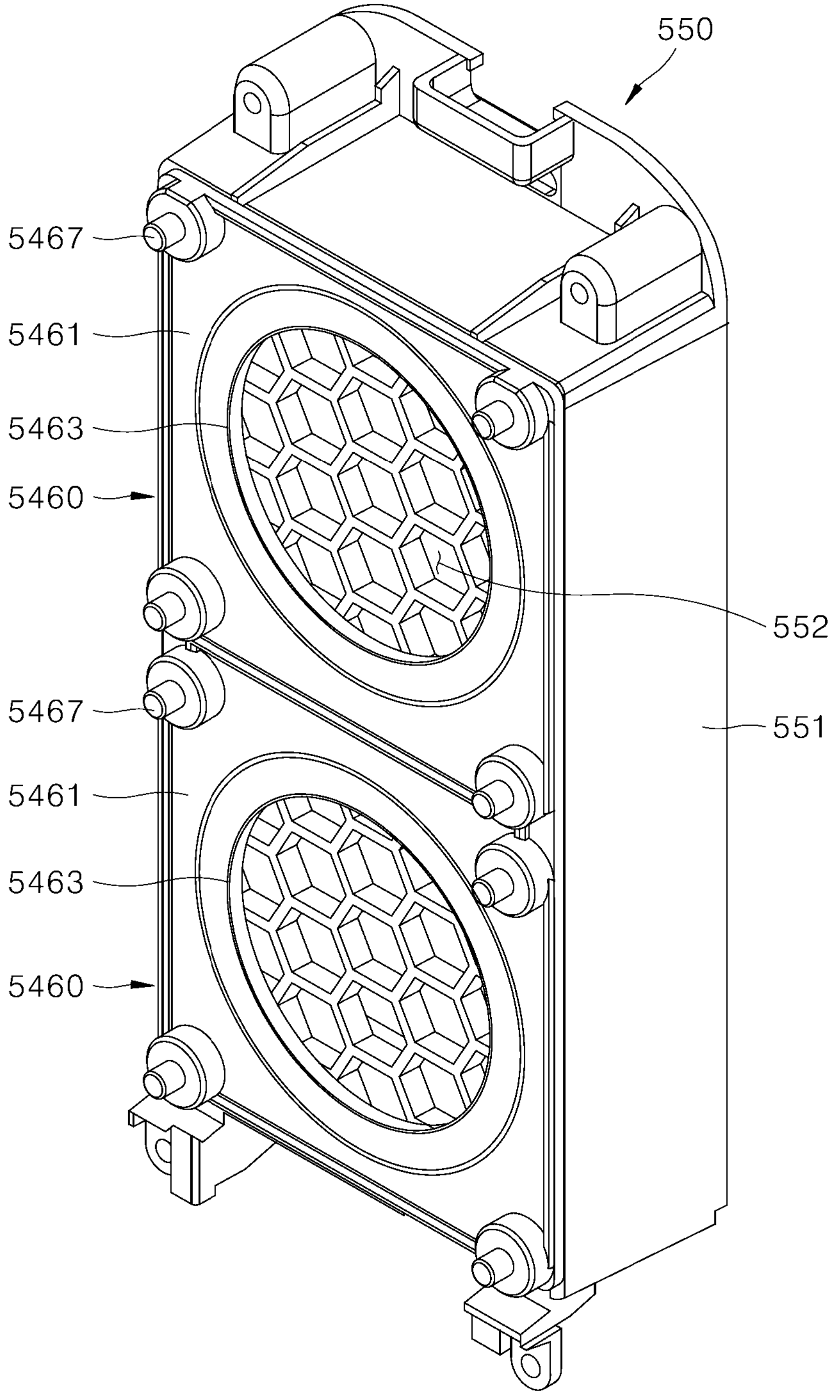
FIG. 16 is a perspective view showing a coupling state between the fan base and the filter.

FIG. 14 is an exploded perspective view separately showing a fan module, a fan base and a filter, FIG. 15 is a rear perspective view showing the rear surface of a fan base, and FIG. 16 is a perspective view showing a coupling state between the fan base and the filter.

Referring to FIGS. 7 and 13 to 16, the portable air purifier 50 according to the present disclosure may further include a fan base 5460.

The fan base 5460 may be disposed between the filter module 550 and the fan module 540, 545. The fan base 5460 may be formed into a shape corresponding to the shape of the filter surface. For example, the fan base 5460 may be formed into a shape of the filter 559 viewed from the front, i.e., a rectangular shape. The fan base 5460 may include a base plate 5461, and a bell mouth 5463.

In this embodiment, two fan bases 5460 disposed in the third direction, i.e., the up-down direction, are disposed between the filter module 550 and the fan module 540, 545, for example. At this time, one fan base 5460 disposed in the upper portion is disposed between the first fan module 540 and the filter module 550, and the other fan base 5460 disposed in the lower portion is disposed between the second fan module 545 and the filter module 550.

When the fan base 5460 is provided separately depending on the number of the fan modules, the fan base 5460 may be provided in response to the number of the fan modules even if the number of the fan modules varies. That is, when one fan module is provided, one fan base 5460 is applied, and when two or more fan modules are provided, the same number of the fan bases 5460 as the number of the fan modules may be stacked in the up-down direction. Thus, the fan base 5460 is provided regardless of the number of the fan modules, ensuring ease of management of components.

Despite the fact, the fan base 5460 may be provided in a way that a single fan base 5460 includes a plurality of fan inlets 5462.

The base plate 5461 may be disposed between the filter module 550 and the fan module 540, 545. The length of the base plate 5461 in the first direction may be much less than that of the filter module 550 and the fan module 540, 545. For example, the base plate 5461 may be formed into a rectangular plate.

The base plate 5461 may have a fan inlet 5462. The fan inlet 5462 may be formed in a way that fan inlet 5462 penetrates on the base plate 5461 in the first direction. The fan inlet 5462 may be disposed approximately in the position where the fan inlet 5462 overlaps the air discharge part 532, 533 (see FIG. 13) of the fan cover 530 and the fan outlet 5430*a* of the fan module 540, 545 in the first direction. The fan inlet 5462 formed as described above may form a passage that connects between the filter 559 and the fan module 540, 545, at the fan base 5460.

The bell mouth 5463 may protrude from the base plate 5461. The bell mouth 5463 may protrude from the base plate 5461 to the fan module 540, 545, in the axial direction.

In the embodiment, the fan inlet 5462 has the same shape as the shroud 5457, i.e., a circular shape, for example. Additionally, the radius of the fan inlet 5462 may be set similarly to the radius of a portion of the shroud 5457, which is adjacent to the fan inlet 5462.

The bell mouth 5463 may be formed in a way that the bell mouth 5463 surrounds the outer circumferential surface of the fan inlet 5462 formed as described above. In other words, the fan inlet 5462 may be formed in a way that the fan inlet 5462 penetrates at the inside of the bell mouth 5463 in the radial direction of the bell mouth 5463.

The bell mouth 5463 may protrude toward the fan module 540, 545 from the fan inlet 5462 in the first direction. At this time, at least a portion of the bell mouth 5463 may be inserted into the shroud 5457 in the radial direction of the shroud 5457. The bell mouth 5463 guides a suction flow at the entrance of the fan module 540, 545, and help to improve the suction and discharge performance of the fan module 540, 545.

The fan base 5460 may be coupled to the fan base 5460. To this end, any one of the fan base 5460 and the filter module 550 may have a fastening boss 5433, and any one of the fan base 5460 and the filter module 550 may have a second fastening projection 553. In the embodiment, the fan base 5460 has the fastening boss 5433, and the filter module 550 has the second fastening projection 553, for example.

The fastening boss 5433 may protrude from the base plate 5461 to the filter module 550 in the first direction. The fastening boss 5433 may have a hollow hole. The second fastening projection 553 may protrude from the filter module 550, specifically, the front surface of the filter case 551, toward the fan base 5460 in the first direction. The second fastening projection 553 may be fitted into and coupled to the fastening boss 5433 in a way that the second fastening projection 553 is inserted into the hollow hole of the fastening boss 5433.

In an example, a total of four fastening bosses 5433 are provided, and each of the fastening bosses 5433 may be disposed at each edge of the first support part 5430. The second fastening projection 553 may be disposed respectively in positions corresponding to the positions of the fastening bosses 5433.

Based on the coupling between the second fastening projection 553 and the fastening boss 5433, the fan base 5460 and the filter module 550 may be coupled at a plurality of points. As the fan base 5460 is coupled to the filter module 550 as described above, the fan base 5460 may be fixed to the front of the filter module 550.

Additionally, the fan base 5460 may be coupled to the fan module 540, 545. To this end, any one of the fan base 5460 and the fan module 540, 545 is provided with a third fastening projection 5467, and the other may be provided with a projection boss 5442. In the embodiment, the fan base 5460 is provided with the third fastening projection 5467, and the fan module 540, 545 is provided with the projection boss 5442, for example.

The projection boss 5442 may protrude from the second support part 5440 toward the fan base 5460 in the first direction. The projection boss 5442 may have a hollow hole. The third fastening projection 5467 may protrude from the front surface of the base plate 5461 toward the front. The third fastening projection 5467 may be fitted into and coupled to the fastening boss 5433 in a way that the third fastening boss 5467 is inserted into the hollow hole of the projection boss 5442.

As the projection boss 5442 and the third fastening projection 5467 are coupled, the fan base 5460 and the fan module 540, 545 may be coupled such that the second support part 5440 is spaced a predetermined distance apart from the base plate 5461. At this time, the predetermined distance is set to the length of a portion of the fan 5450 in the axial direction, protruding outward in the radial direction of the second support part 5440, e.g., the length of the shroud 5457 in the first direction, or greater.

Further, a total of four projection bosses 5442 are provided, and each of the projection bosses 5442 may be disposed at each edge of the second support part 5440. The third fastening projection 5467 may be disposed respectively in positions corresponding to the positions of the projection bosses 5442.

A gap between the portions where each of the projection bosses 5442 and each of the third fastening projections 5467 are coupled may be open in the radial direction. Additionally, a portion of the fan 5450, specifically, a portion of the shroud 5457, may protrude outward in the radial direction of the second support part 5440 through the open portions.

The fan base 5460 described above may serve as a coupling medium for coupling between the fan module 540, 545 and the filter module 550, and guide a suction flow at the entrance of the fan module 540, 545 to improve the suction and discharge performance of the fan module 540, 545.

[Aspect of Air Flow of Portable Air Purifier]

Figure 17:
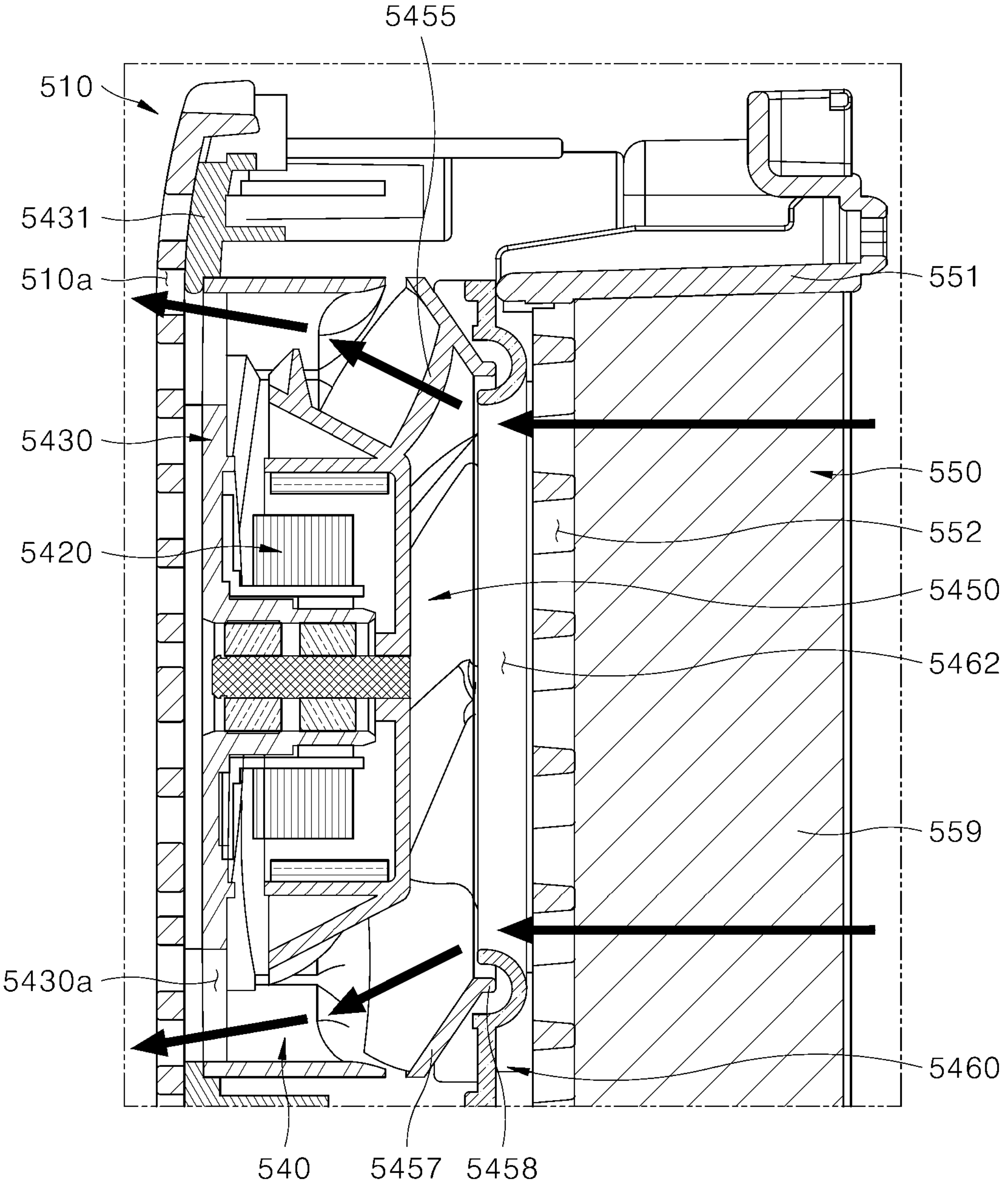
FIG. 17 is a view showing an aspect of the air flow of the portable air purifier of one embodiment.

FIG. 17 is a view showing an aspect of the air flow of the portable air purifier of one embodiment.

In FIG. 17, some components are omitted from the portable air purifier.

Hereafter, an aspect of the air flow of the portable air purifier in the embodiment is described with reference to FIGS. 4 and 17.

Referring to FIGS. 4 and 17, as the fan module 540, 545 operates, air behind the portable air purifier 50 flows into the portable air purifier 50. At this time, the air behind the portable air purifier 50 may pass through the suction surface through the first suction inlet 570*a* formed on the rear surface cover 580.

The air having passed through the suction surface and having flown into the portable air purifier 50 passes through the filter 559, and while the air passes through the filter 559, the filter 60 can filter physical particles such as dust/fine dust/ultra fine dust and the like, chemical substances such as odorant particles/harmful gases and the like, and microorganisms such as germs/viruses and the like, that are included in the air.

At this time, the air may be suctioned into the filter 559 through the suction surface that has as much surface area as the filter surface. Additionally, the air suctioned through the suction surface may be filtered through the filter surface that has as much surface area as the fan module 540, 545.

That is, air may be suctioned and filtered effectively through the suction surface and the filter surface that have sufficient surface areas corresponding to the surface area of the fan module 540, 545. Additionally, since the suction surface, the filter surface and the fan module 540, 545 are disposed in a straight line, air may be suctioned and filtered effectively while flow loss is minimized.

The air having passed through the filter 559, i.e., purified air, may flow into the fan module 540, 545 through the fan inlet 5462. The flow of the air passing through the fan inlet 5462 may be guided by the bell mouth 5463, and accordingly, a smooth inflow of air to the fan module 540, 545 may be induced effectively.

The air having flown into the fan module 540, 545 may be discharged in a mixed flow direction while being discharged from the front of the fan module 540, 545 through the fan outlet 5430*a*. The mixed flow direction may be defined as a front-side diagonal direction.

The air, discharged from the front of the fan module 540, 545, i.e., purified air, passes through the fan cover 530, and is discharged from the front of the portable air purifier 50. At this time, the purified air may pass through the discharge surface through the discharge outlet 510*a* formed on the front cover 510.

The purified air may be discharged through the discharge surface that has as much surface area as the suction surface, the filter surface and the fan module 540, 545. That is, the purified air may be discharged effectively through the discharge surface that has a sufficient surface area corresponding to the surface area of the suction surface, the surface area of the filter surface and the surface area of the fan module 540, 545. Further, since the suction surface, the filter surface, the fan module 540, 545 and the discharge surface are disposed in a straight line, air may be suctioned and filtered, and purified air may be discharged, effectively, while flow loss is minimized.

[Effect of Portable Air Purifier with Mixed Flow Fan-Type Fan]

The portable air purifier 50 in the embodiment include a mixed flow fan type-fan 5450. The portable air purifier 50 may produce the following effects.

First, since the fan module 540, 545 includes a mixed flow fan-type fan 5450, the fan module 540, 545 may ensure improvement in air purification performance, compared to a fan module including an axial flow fan-type fan.

The axial flow fan allows air to be suctioned and discharged in a straight line. The axial flow fan may have a small thickness, and can be applied to a small-sized air purifier.

However, the performance of the axial flow fan significantly deteriorates at fixed pressure. For example, if the density or the thickness of the filter 559 increases to enhance filtering performance, the suction and discharge performance of the axial flow fan may significantly deteriorate. Accordingly, it is difficult to apply an axial flow fan to a portable air purifier with a high performance filter.

The mixed flow fan is somewhere between an axial flow fan and a centrifugal fan, and ensures more excellent performance at fixed pressure than the axial flow fan on condition that the mixed flow fan has the same size as the axial flow fan. However, the length of a mixed flow fan in the axial direction is greater than that of an axial flow fan on condition that the mixed flow fan has the same size as the axial flow fan.

However, the axial flow fan is inappropriate to send high-pressure high-speed air. Accordingly, a portable air purifier to which an axial flow fan is applied needs to further include a structure such as a guide vane. For example, a guide vane may be formed in the air discharge part 532, 533 of the fan cover 530. The guide vane may be a cause for an increase in the length of the fan cover 530 in the first direction, i.e., the thickness of the fan cover 530.

An increase in the thickness of the fan cover 530, caused by the guide vane, results in a decrease in the length of the axial flow fan in the first direction due to the limited space in the portable air purifier, and a deterioration in the suction and discharge performance of the axial flow fan.

Unlike an axial flow fan, a mixed flow fan is appropriate to send high-pressure high-speed air. That is, without a structure such as a guide vane, the mixed flow fan may send air much farther than the axial flow fan.

For this reason, in the embodiment, the fan cover 530 excludes a structure such as a guide vane. Accordingly, the thickness of the fan cover 530 decreases, and the fan module 540, 545 is small enough to be inserted into the air discharge part 532, 533. For example, the length of the fan module 540, 545 in the first direction may be determined to the extent that the front surface of the fan module 540, 545 and the front surface of the fan cover 530 constitute the same surface. That is, the length of the fan module 540, 545 in the first direction may extend by a length occupied by a guide vane.

As the size of the fan module 540, 545 increases, the suction and discharge performance of the fan module 540, 545 improves, enabling the portable air purifier 50 in the embodiment to ensure improvement in air purification performance.

Additionally, in the structure of the fan module 540, 545, the fan case 5430, 5440 does not surround the fan 5450 from the outside in the radial direction. That is, the fan 5450 may be formed to protrude further in the centrifugal direction than the inner circumferential surface of the second support part 5440. Accordingly, at least a portion of the fan 5450 may protrude to a gap between the second support part 5440 and the base plate 5461.

Since the fan 5450 protrudes further in the centrifugal direction than the inner circumferential surface of the second support part 5440 as described above, the size of the fan 5450 may increase.

As the size of the fan module 540, 545 increases as described above, the suction and discharge performance of the fan module 545, 545 improves, enabling the portable air purifier 50 in the embodiment to ensure improvement in air purification performance.

Second, since the fan module 540, 545 includes a mixed flow fan-type fan 5450, the range in which the portable air purifier 50 discharges air may expand.

A mixed flow fan can discharge air in the mixed flow direction, and accordingly, purified air discharged through the discharge surface may be discharged in the mixed flow direction, i.e., a direction between the front and the centrifugal direction.

When it comes to a small-sized portable air purifier 50, if purified air is discharged toward the front only in a straight line, the range of the discharge of the purified air is limited to a range corresponding to the discharge surface.

If the purified air is discharged within a range corresponding to the discharge surface, even considering the properties of the small-sized portable air purifier 50, limitations are imposed on the use of the portable air purifier 50.

For example, the user has to keep holding up the portable air purifier 50 or has to accurately adjust the position of the portable air purifier 50 such that the discharge outlet 510*a* faces the user's face, causing inconvenience to the user.

The portable air purifier 50 in the embodiment may discharge high-pressure high-speed air in a direction between the front and the centrifugal direction. Accordingly, purified air may spread to a large area as well as reaching a far corner, enabling the portable air purifier 50 to ensure improvement in air purification performance.

Third, each fan module 540, 545 includes the mixed flow fan-type fan 5450, and a plurality of fan modules 540, 545 are stacked, allowing purified air to be discharged far away.

As described above, a mixed flow fan can discharge air in the mixed flow direction.

At this time, a collision between air discharged from the first fan module 540 and air discharged from the second fan module 545 may occur, in the portion where the fan modules 540, 545 are adjacent to each other.

For example, air may be discharged downward at a slant at the lower side of the first fan module 540 adjacent to the second fan module 545, and air may be discharged upward at a slant at the upper side of the second fan module 545 adjacent to the first fan module 540.

At this time, a portion of the air discharged from the first fan module 540 and a portion of the air discharged from the second fan module 545 may collide with each other. Thus, their radiuswise speed vector decreases, and their frontwise speed vector may increase.

A decrease in the radiuswise speed vector and an increase in the frontwise speed vector denote the direction of speed vector of air discharged from the portable air purifier 50 changes to a direction close to the front.

As a result, the portable air purifier 50 discharges air mainly toward the front, and allows the air to reach a far corner, ensuring improvement in air purification performance.

[Another Example of Fan Base]

Figure 18:
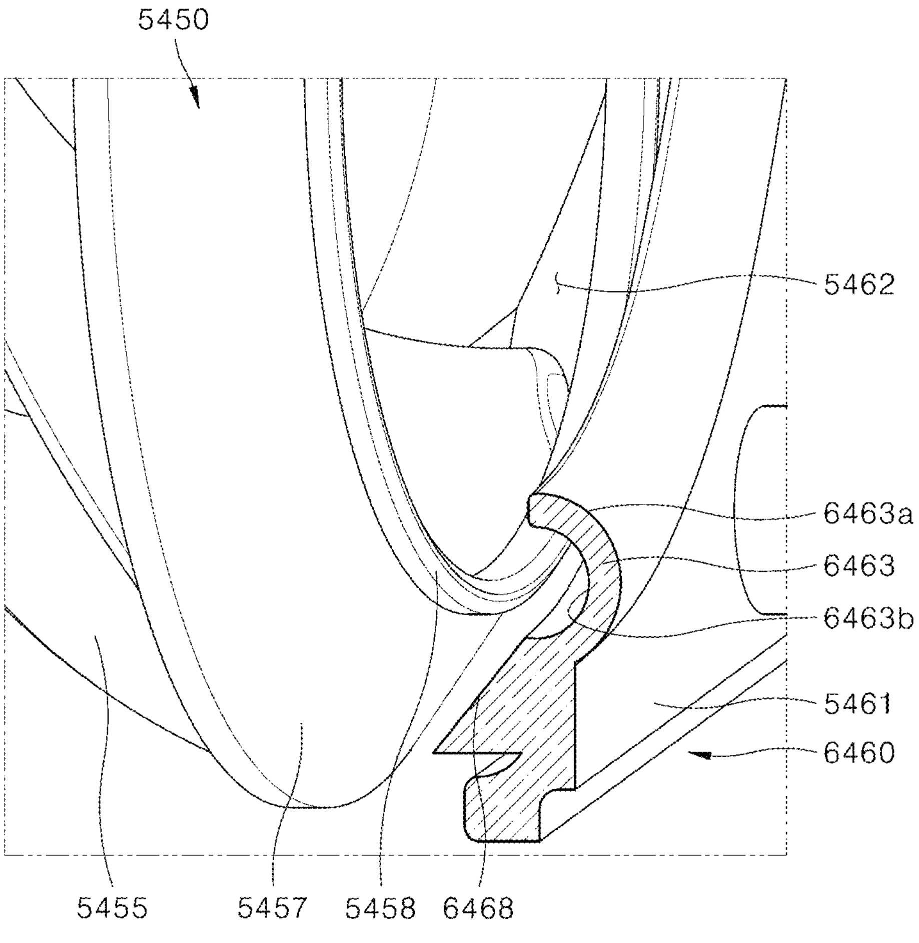
FIG. 18 is a view showing the structure of a fan base provided in a portable air purifier of another embodiment.
Figure 19:
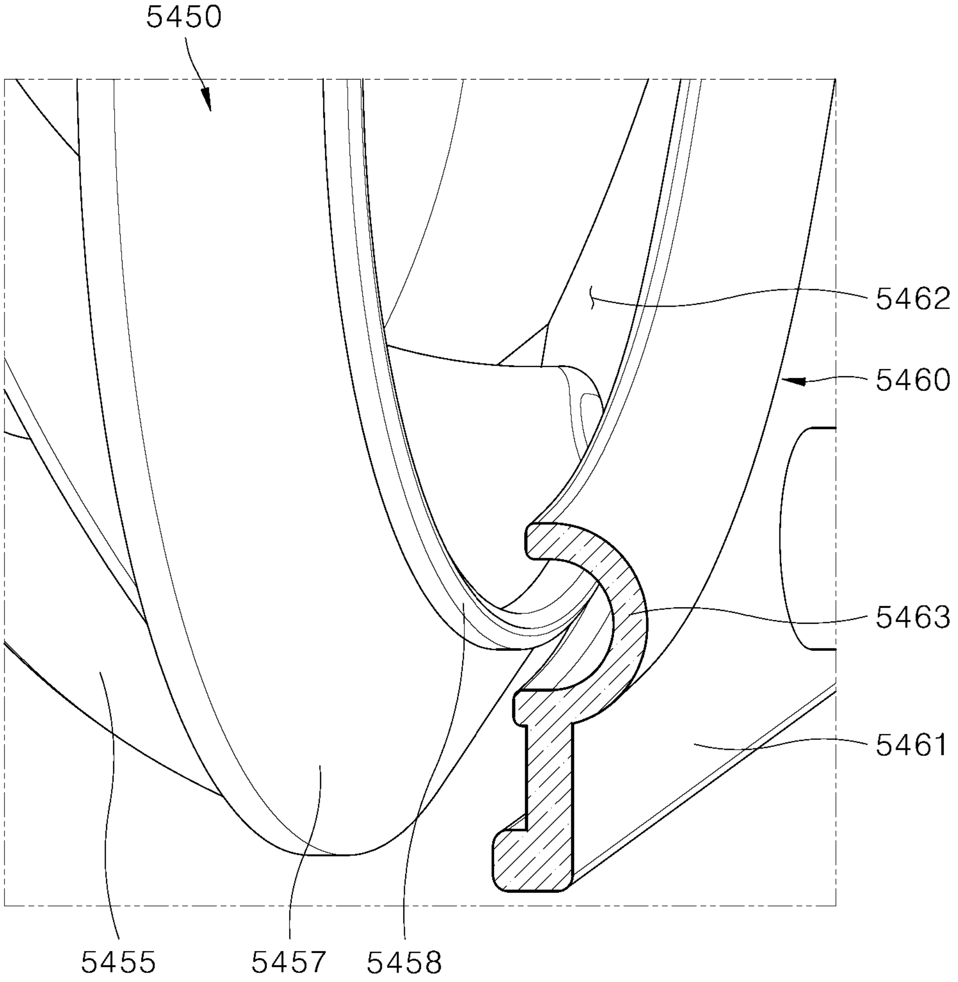
FIG. 19 is a view showing the structure of a fan base without a projection rib.
Figure 20:
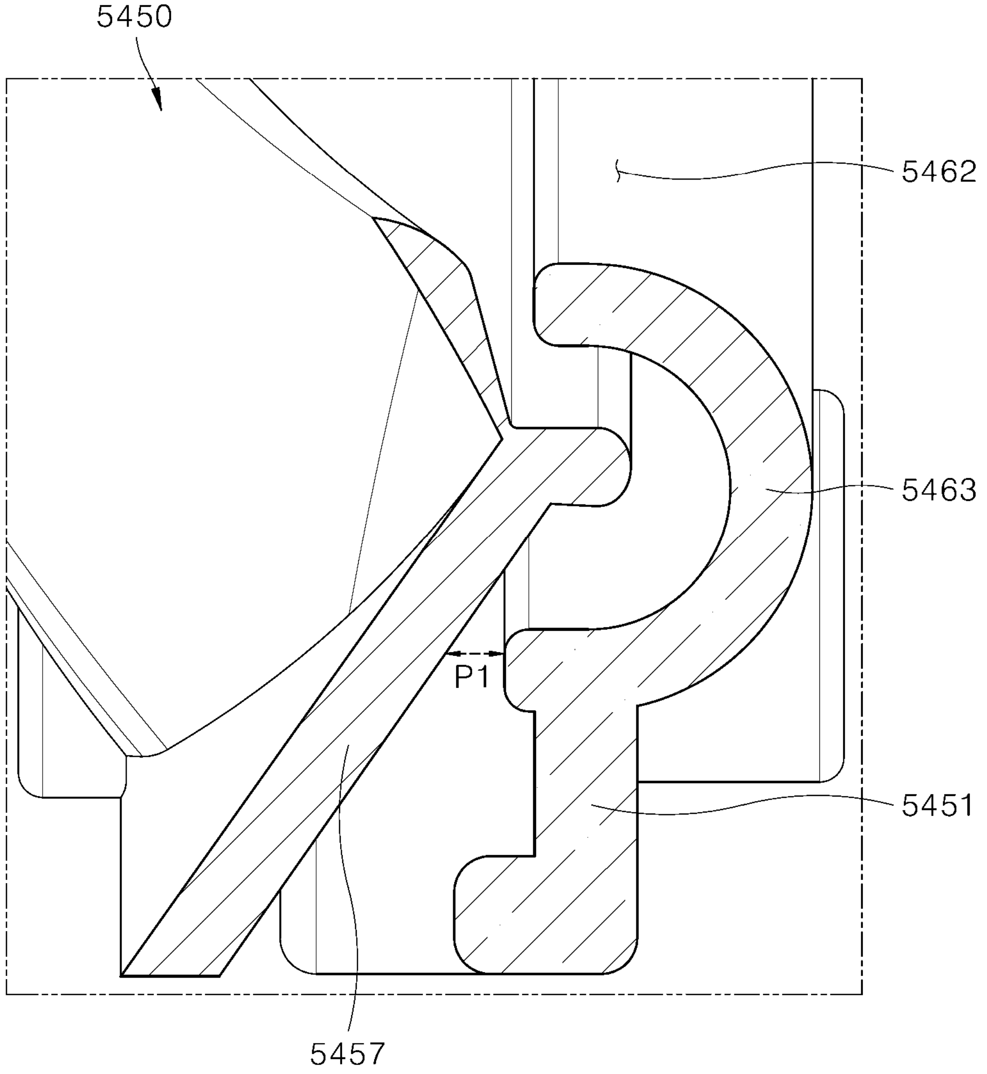
FIG. 20 is a cross-sectional view showing the structures of the fan and the fan base in FIG. 19.
Figure 21:
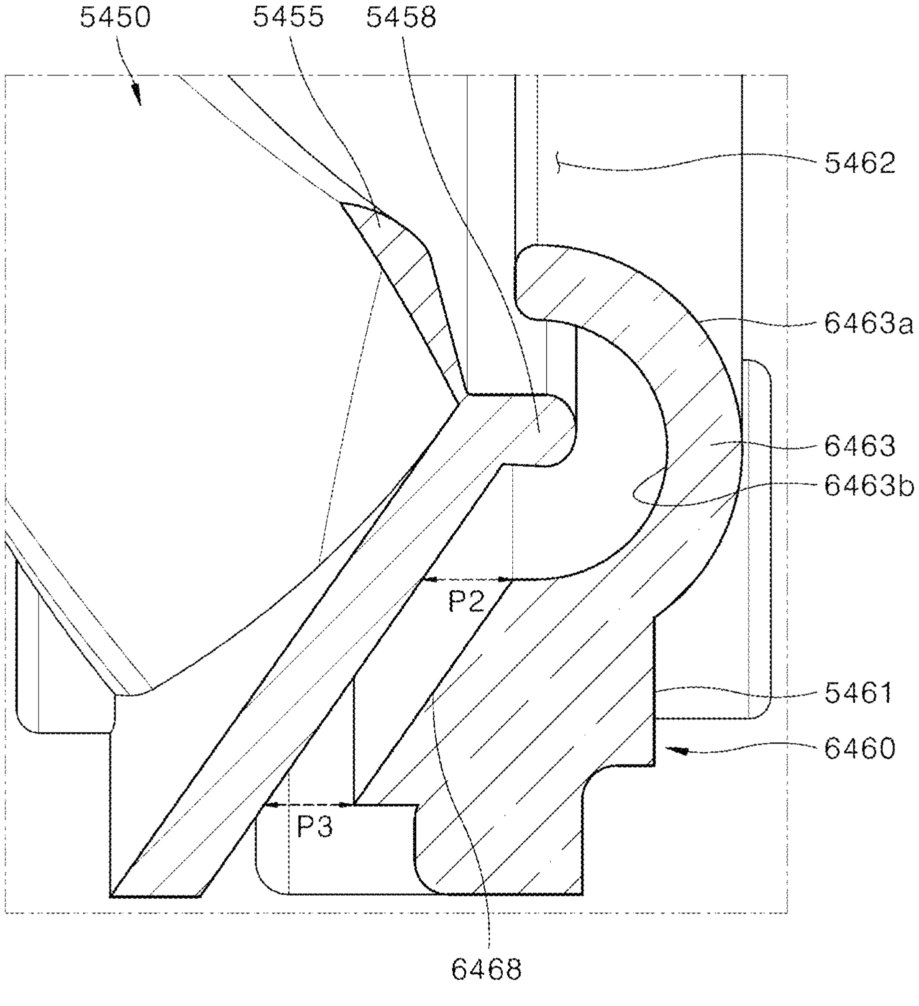
FIG. 21 is a cross-sectional view showing the structures of the fan and the fan base in FIG. 18.

FIG. 18 is a view showing the structure of a fan base provided in a portable air purifier of another embodiment, and FIG. 19 is a view showing the structure of a fan base provided in the portable air purifier of one embodiment. FIG. 20 is a cross-sectional view showing the structures of the fan and the fan base in FIG. 19, and FIG. 21 is a cross-sectional view showing the structures of the fan and the fan base in FIG. 18.

Hereafter, the structure of the portable air purifier of another embodiment is described with reference to FIGS. 18 to 21.

Referring to FIG. 18, a fan base 6460 of the portable air purifier in another embodiment may include a base plate 5461, a bell mouth 6463, and a projection rib 6468.

As described with reference to the above embodiment, the base plate 5461 may be formed into a rectangular plate, and a fan inlet 5462 may be formed at the base plate 5461 in a way that penetrates in the first direction.

The bell mouth 6463 may protrude from the inner circumferential surface of the base plate 5461 in the axial direction. A surface of the bell mouth 6463, facing the filter module 550, is referred to as a first surface 6463*a* of the bell mouth 6463, and a surface of the bell mouth 6463, facing the fan module 540, 545 (see FIG. 4) is referred to as a second surface 6463*b* of the bell mouth 6463. Accordingly, the first surface 6463*a* of the bell mouth 6463 is convex toward the filter module 550, and the second surface 6463*b* is concave.

For example, the first surface 6463*a* of the bell mouth 6463 is convex toward the filter module 550 in a rounded manner, and the second surface 6463*b* of the bell mouth 6463, which is the opposite surface of the first surface, may be depressed in a way that corresponds to the shape of the first surface of the bell mouth 6463. Accordingly, space surrounded by the second surface 6463*b* of the bell mouth 6463 may be formed in the bell mouth 6463.

At least a portion of the fan 5450 may be inserted into the space surrounded by the second surface 6463*b* of the bell mouth 6463. Thus, at least a portion of the bell mouth 6463 may be disposed to overlap the fan module 540, 545 (see FIG. 4).

Specifically, at least a portion of the shroud 5457 may be inserted into the space surrounded by the second surface 6463*b* of the bell mouth 6463. In the embodiment, the bell mouth 6463 is formed into a half ring, for example. At this time, the bell mouth 6463 may be entirely formed into a half ring, and the longitudinal cross section of the bell mouth 6463 may have a half ring shape.

Accordingly, space having a half-circle cross section may be formed in the bell mouth 6463. At least a portion of the shroud 5457 may be inserted into the space having a half-circle cross section.

The shroud 5457 may be disposed closest to the bell mouth 6463, at the fan 5450. The shroud 5457 may be provided with a shroud projection 5458, at the end portion in the first direction, specifically, the end portion of the rear side of the shroud 5457.

The shroud projection 5458 may protrude rearward from the end portion of the rear side of the slant surface of the shroud 5457. The shroud projection 5458 may form a protruding surface that extends in the first direction, i.e., in a parallel direction with the direction in which the fan module 540, 545 and the filter module 550 (see FIG. 7) are disposed, unlike the slant surface of the shroud 5457.

At least a portion of the shroud projection 5458 may be inserted into the space surrounded by the second surface 6463*b* of the bell mouth 6463. Accordingly, at least a portion of the fan 5450 may be inserted into the space surrounded by the second surface 6463*b* of the bell mouth 6463, and at least a portion of the bell mouth 6463 may be disposed to overlap the fan module 540, 545.

The shroud projection 5458, provided as described above, may block a gap in the lateral direction between the fan 5450 and the fan base 6460, together with the bell mouth 6463, and suppress generation of whirlwind between fan base 6460 and the fan 5450.

Additionally, the shroud projection 5458 may result in an increase in the thickness of the inner circumferential surface of the shroud 5457, improving the rigidity of the fan 5450.

The fan base 6460 may further include a projection rib 6468. The projection rib 6468 may protrude from the base plate 5461 and be disposed outside the bell mouth 6463 in the radial direction of the bell mouth 6463, In the embodiment, the projection rib 6468 protrudes toward the shroud 5457 from the base plate 5461 in the axial direction while surrounding the bell mouth 6463 from the outside in the radial direction, for example.

The projection rib 6468 may protrude in a way the forms a slant surface. The slant surface of the projection rib 6468 may be formed into a slant surface that is spaced a predetermined distance apart from the shroud 5457 and is parallel with the slant surface of the shroud 5457.

The projection rib 6468 may form a slant surface that extends in the centrifugal direction from the end portion outside the bell mouth 6463 in the radial direction of the bell mouth 6463. At this time, the slant surface of the projection rib 6468 may be formed into a slant surface that inclines forward toward the centrifugal direction. At this time, the gradient of the slant surface of the projection rib 6468 may be the same as the gradient of the slant surface of the shroud 5457. Accordingly, the slant surface of the projection rib 6468 may be spaced a predetermined distance apart from the shroud 5457, and formed into a slant surface parallel with the slant surface of the shroud 5457.

Further, the projection rib 6468 may be integrated with the base plate 5461. Specifically, the base plate 5461, the bell mouth 6463 and the projection rib 6468 may be integrally formed.

[Operation and Effect of Fan Base with Projection Rib]

FIG. 19 is a view showing the structure of a fan base without a projection rib, FIG. 20 is a cross-sectional view showing the structures of the fan and the fan base in FIG. 19, and FIG. 21 is a cross-sectional view showing the structures of the fan and the fan base in FIG. 18.

Referring to FIGS. 19 and 20, a gap of a predetermined distance may be formed between the fan base 5460 and the fan 5450. Specifically, a gap of a predetermined distance may be formed between the base plate 5461 and the bell mouth 5463 of the fan base 5460 and the shroud 5457 of the fan 5450.

The fan base 5460 is fixed to the filter module 550 (see FIG. 7) and the fan case 5440, and the fan 5450 is rotatably provided. Accordingly, a gal of a predetermined distance needs to be formed between the fan base 5460 and the fan 5450.

Considering the shape of the fan base 5460 and the shape of the fan 5450, the narrowest gap between the fan base 5460 and the fan 5450 is formed at the point where the boundary portion between the bell mouth 5463 and the base plate 5461 faces the shroud 5457 in the axial direction (hereafter, a "minimum gap point").

At the point, a portion of the bell mouth 5463, disposed at a frontmost side, is placed. Additionally, a portion of the shroud, disposed relatively rearward, is placed at the point. Certainly, the rearmost end portion of the shroud 5457 is not place at the point. However, a gap between the bell mouth 5463 and the shroud 5457 at a point further rearward than the minimum gap point P1 may be greater than at the minimum gap point P1, because of the half ring shape of the bell mouth 5463.

The gap between the fan base 5460 and the fan 5450 may increase toward the centrifugal direction from the minimum gap point P1. That is, a gap that increases toward the centrifugal direction is formed between the fan base 5460 and the fan 5450.

In relation to pressure distribution in the fan module 540, 545 (see FIG. 4), pressure is relatively high at the discharge side of the fan 5450, i.e., the outlet side 5430*a* (see FIG. 7), and pressure is relatively low at the suction side of the fan 5450, i.e., near the fan base 5460. Accordingly, whirlwind may be generated between the fan base 5460 and the fan 5450, and may flow into the suction side of the fan 5450 through the gap between the fan base 5460 and the fan 5450, specifically, the gap between the bell mouth 5463 and the shroud 5457.

In the above structure, a gap that increases toward the centrifugal direction is formed between the fan base 5460 and the fan 5450. That is, a wide entrance may be formed between the fan base 5460 and the fan 5450, making it easier for whirlwind to flow into the suction side of the fan through the gap between the bell mouth 5463 and the shroud 5457.

The whirlwind flowing into the suction side of the fan 5450 may interfere with the flow of air, flowing into the fan 5450 through the fan inlet 5462, causing flow loss.

To reduce the effect of the whirlwind, the gap between the bell mouth 5463 and the shroud 5457 may decrease. As the gap between the bell mouth 5463 and the shroud 5457 becomes narrower, the possibility that whirlwind is generated and flows into the fan 5450 may be reduced. Thus, a decrease in the gap between the bell mouth 5463 and the shroud 5457 may lead to a reduction in flow loss.

However, a narrow gap between the bell mouth 5463 and the shroud 5457 is highly likely to cause contact between the fan 5450 and the bell mouth 5463. For example, as the fan 5450 moves rearward due to an external force applied to the portable air purifier, the fan 5450 and the bell mouth 5463 may contact. That is, a narrower gap between the bell mouth 5463 and the shroud 5457 is highly likely to result in contact between the fan 5450 and the bell mouth 5463, which is caused by an external force.

The portable air purifier that is usually carried for use is inherently affected by an external force more frequently than another type of air purifier, e.g., a large-sized air purifier that is used in indoor space. Since the portable air purifier is frequently gripped by the user, for use, the gap between the fan 5450 and the bell mouth 5463 often decreases as the portable air purifier is pressed in the front-rear direction.

It is inappropriate to decrease the gap between the bell mouth 5463 and the shroud 5457, as a way of reducing the effect of whirlwind.

Considering the fact, in the embodiment, the fan base 6460 is provided with a projection rib 6468, as illustrated in FIGS. 18 and 21.

The projection rib 6468, as described above, may protrude in a way that forms a slant surface. The slant surface of the projection rib 6468 is spaced a predetermined distance apart from the shroud 5457 and formed in parallel with the slant surface of the shroud 5457.

The projection rib 6468 may be provided in a way that extends in the centrifugal direction from the boundary portion between the bell mouth 6463 and the base plate 5461. Accordingly, a gap between the fan base 6460 and the shroud 5457 may remain constant in the portion where the projection rib 6468 is formed. Accordingly, a gap is formed between the projection rib 6468 and the shroud 5457, in the portion where the projection rib 6468 is formed, and the length of the gap in the axial direction may remain constant within the area where the projection rib 6468 is formed.

That is, in the area where the projection rib 6468 is formed, the width of the gap between the fan base 6460 and the shroud 5457 may remain constant without increasing toward the centrifugal direction (P2-P3).

Additionally, the entrance of the gap, i.e., the width P3 of the outermost portion of the gap in the radial direction of the gap, which is open in the lateral direction, may be maintained at the width of the gap or less at the minimum gap point P1. That is, unlike the above-described structure, an environment where whirlwind hardly flows into the fan module through the gap between the bell mouth 6463 and the shroud 5457 may be created, in the embodiment.

Accordingly, even if the fan base 6460 and the fan 5450 do not contact each other excessively to reduce the gap between the bell mouth 6463 and the shroud 5457, the generation of whirlwind may be suppressed effectively.

Thus, the occurrence of flow loss caused by whirlwind may be suppressed, and the fan base 6460 and the fan 5450 do not need to contact each other excessively, reducing the possibility of failure in a product, caused by difficulty in assembly and tolerance.

Further, the projection rib 6468 may also help to increase the thickness of the peripheral portion of the bell mouth 6463. Accordingly, even if an external force is applied to the portable air purifier, the bell mouth 6463 and its peripheral portion are rarely deformed. That is, although the portable air purifier is pressed in the front-rear direction, the gap between the fan 5450 and the bell mouth 6463 is not narrowed easily.

As a result, the possibility of contact between the fan 5450 and the bell mouth 6463, caused by an external force, may decrease, and wear or damage to the fan 5450 and its surrounding components, caused by contact between the fan 5450 and the bell mouth 6463, is much less likely to occur.

Furthermore, as resistance against the deformation of the bell mouth 6463 and its peripheral portion increases, the gap between the fan base 6460 and the shroud 5457 may be designed to decrease further. Accordingly, the possibility of the occurrence of flow loss caused by whirlwind may decrease further.

FIG. 22 is a table showing results of measurement of noise and press volume, with or without a projection rib.

FIG. 22 shows results of experiments of a portable air purifier including a fan base without a projection rib, and the portable air purifier in the embodiment, i.e., a portable air purifier including a fan base with a projection rib.

The experiments were performed under the same conditions except that the projection rib was applied or not. In relation to the portable air purifier without the projection rib, experiments were performed on the condition that the widths of the minimum gap point were 0.4 mm and 1.0 mm. In relation to the portable air purifier with the projection rib, an experiment was performed on the condition that the width of the minimum gap point was 1 mm.

Additionally, noise was measured on condition that air volume was the same. Increasing noise may denote increasing flow loss. Accordingly, results of the measurement of noise may help to indirectly determine whether whirlwind is formed.

Further, to measure the press volume, a force was applied to the front of the portable air purifier with a pushpull gauge, and a numerical value measured by the pushpull gauge was checked when noise was made because of contact between the fan and the fan base.

Hereafter, the effect of the portable air purifier in the embodiment is described with reference to FIGS. 21 and 22.

The results of the experiments indicate that excellent noise performance was ensured (41.7 dB) while the press volume was low (4.7N), at the 0.4-mm width of the minimum gap point P1, without the projection rib (the first experimental example).

The results of the experiments indicate that noise increased (42.2 dB) while the press volume increased (27.9N), at the 1-mm width of the minimum gap point P1, without the projection rib (the second experimental example).

In the above experiments, a decreasing width of the minimum gap point P1 resulted in decreasing noise, without the projection rib. However, the fan 5450 and the bell mouth 6463 contacted each other easily. An increasing width of the minimum gap point P1 resulted in increasing noise.

In the third experiment with the projection rib 6468, noise performance was 41.7 dB similar to that of the first experimental example, and the press volume was 28.4N higher than that of the second experimental example.

The results of the experiments are as follows.

That is, the portable air purifier 50 with the projection rib 6468 in the embodiment may effectively suppress the occurrence of flow loss caused by whirlwind, and the contact between the fan 5450 and the fan base 6460 caused by an external force.

The portable air purifier 50 in the embodiment provides a high-level of suction and discharge performance while suppressing flow loss caused by whirlwind and reducing noise, ensuring improvement in air purification performance.

Additionally, the portable air purifier 50 in the embodiment may effectively suppress contact between the fan 5450 and the fan case 6460, caused by an external force, reducing the possibility of wear or damage to the fan 5450 and its surrounding components and ensuring improvement in durability.

The embodiments are described above with reference to a number of illustrative embodiments thereof. However, the embodiments set forth herein are provided only as examples, and numerous other modifications and embodiments can be devised by one skilled in the art without departing from the technical spirit of the disclosure. The technical protection scope of the disclosure should be defined according to the appended claims.

DESCRIPTION OF REFERENCE NUMERALS

50: Portable air purifier
510: Front surface panel
510*a*: Outlet
520: Case
525: First connection surface part
530: Fan cover
531: Upper cover part
532: Upper air discharge part
533: Lower air discharge part
534: First fastening projection
535: Lower cover part
540, 545: Fan module
540: First fan module
545: Second fan module
550: Filter module
551: Filter case
552: Penetration hole
553: Second fastening projection
559: Filter
560: Battery
570: Rear surface panel
580: Rear surface cover
5410: Shaft
5420: Motor
5421: Stator
5423: Rotor
5430, 5440: Fan case
5430: First support part
5430*a*: Outlet
5431: Support plate
5433: Boss
5435: Bearing
5440: Second support part
5441: Fastening hole
5442: Projection boss
5443: Side rib
5445: Connection part
5450: Fan
5451: Hub
5452: Hub plate part
5452*a*: Shaft coupling part
5453: Skirt part
5454: Inner projection part
5455: Fan blade
5455*a*: Leading edge
5455*b*: Trailing edge
5455*c*: Shroud chord
5455*d*: Hub chord
5457: Shroud
5458: Shroud projection
5460, 6460: Fan base
5461: Base plate
5462: Fan inlet
5463,6463: Bell mouth
5465: Fastening boss
5467: Third fastening projection
6468: Projection rib

The invention claimed is:

1. A portable air purifier, comprising:

a case having a suction surface on a first side thereof in an axial direction and having a discharge surface on a second side thereof in the axial direction;

a filter disposed between the suction surface and the discharge surface;

a fan module disposed between the discharge surface and the filter that suctions air, having passed through the filter, and discharges the air to the discharge surface; and a fan base that is disposed between the filter and the fan module, coupled to the fan module, and forms a passage that connects the filter and the fan module, wherein the fan base comprises:

a base plate disposed between the filter and the fan module; and a fan inlet that is formed at the base plate, penetrates the base plate, and forms a passage that connects the filter and the fan module, wherein the fan base further comprises a bell mouth that protrudes from the base plate in the axial direction, wherein the fan inlet is formed at an inside of the bell mouth and penetrates in a radial direction of the bell mouth, wherein the fan module comprises a fan rotatably disposed between the bell mouth and the discharge surface, wherein the bell mouth has a first surface that faces the filter module and is convex toward the filter module and a second surface that faces the fan module and is depressed, while protruding from an inner circumferential surface of the base plate in the axial direction, wherein at least a portion of the fan is inserted into a space surrounded by the second surface, wherein the fan comprises a hub rotatably provided, a shroud spaced a predetermined distance apart from the hub and disposed outside of the hub in a radial direction of the hub, and a fan blade that protrudes from the hub in a centrifugal direction and connects the hub and the shroud, and wherein at least a portion of the shroud is inserted into the space surrounded by the second surface.

2. The portable air purifier of claim 1, wherein the shroud forms a slanted surface that is inclined in the centrifugal direction as the shroud extends away from the filter module in the axial direction, wherein the fan base further comprises a projection rib that protrudes from the base plate toward the shroud in the axial direction while surrounding the bell mouth from the outside in the radial direction, and wherein and the projection rib is spaced a predetermined distance apart from the shroud, and forms a slanted surface parallel with the slanted surface of the shroud.

3. The portable air purifier of claim 2, wherein the slanted surface of the projection rib extends in the centrifugal direction from an end portion outside the bell mouth in the radial direction of the bell mouth.

4. The portable air purifier of claim 3, wherein the base plate, the bell mouth, and the projection rib are integrally formed.

5. The portable air purifier of claim 1, wherein the portable air purifier further comprises a fan cover disposed between the discharge surface and the fan module, wherein the fan cover is provided with an air discharge portion that forms a passage that connects the discharge surface and the fan, wherein the fan module is disposed to face the air discharge portion, wherein the air discharge portion is formed at the fan cover and penetrates in the axial direction, and wherein at least a portion of the fan module is inserted into the air discharge portion.

6. The portable air purifier of claim 5, wherein the fan base further comprises a bell mouth that protrudes from the base plate in the axial direction, and wherein at least a portion of the bell mouth is disposed to overlap the fan module.

* * * * *